United States Patent [19]
Bednarek et al.

[11] Patent Number: 6,009,116
[45] Date of Patent: *Dec. 28, 1999

[54] GPS TV SET TOP BOX WITH REGIONAL RESTRICTIONS

[75] Inventors: Robert A. Bednarek, Greenwich, Conn.; Philip A. Rubin, Washington, D.C.

[73] Assignee: Philip A Rubin and Associates, Inc., Washington, D.C.

[*] Notice: This patent is subject to a terminal disclaimer.

[21] Appl. No.: 08/842,573

[22] Filed: Apr. 15, 1997

Related U.S. Application Data

[63] Continuation-in-part of application No. 08/437,424, May 5, 1995, Pat. No. 5,621,793.

[51] Int. Cl.$^6$ ........................................................ H04B 1/69
[52] U.S. Cl. ........................ 375/200; 348/10; 340/825.31; 340/825.34
[58] Field of Search ............................... 375/200; 380/10, 380/20, 21; 348/10, 8, 9; 455/4.2, 6.3; 340/825.31, 825.34

[56] References Cited

U.S. PATENT DOCUMENTS

| | | |
|---|---|---|
| 3,789,131 | 1/1974 | Harney . |
| 3,826,863 | 7/1974 | Johnson . |
| 3,857,997 | 12/1974 | Toonder . |
| 3,882,266 | 5/1975 | Walding . |
| 3,882,289 | 5/1975 | Walding et al. . |
| 3,882,392 | 5/1975 | Harney . |
| 3,919,463 | 11/1975 | Walding . |
| 4,024,575 | 5/1977 | Harney et al. . |
| 4,054,860 | 10/1977 | Henderson et al. . |
| 4,112,464 | 9/1978 | Guif et al. . |
| 4,135,157 | 1/1979 | den Toonder . |
| 4,145,717 | 3/1979 | Guif et al. . |
| 4,215,366 | 7/1980 | Davidson . |
| 4,531,020 | 7/1985 | Wechselberger et al. . |
| 4,736,422 | 4/1988 | Mason . |
| 4,739,510 | 4/1988 | Jeffers et al. . |
| 4,802,215 | 1/1989 | Mason . |
| 4,807,256 | 2/1989 | Holmes et al. . |
| 4,993,067 | 2/1991 | Leopold . |
| 5,113,440 | 5/1992 | Harney et al. . |
| 5,144,663 | 9/1992 | Kudelski et al. . |
| 5,208,856 | 5/1993 | Leduc et al. . |
| 5,224,161 | 6/1993 | Daniel et al. . |
| 5,243,652 | 9/1993 | Teare et al. . |
| 5,282,249 | 1/1994 | Cohen et al. . |
| 5,295,188 | 3/1994 | Wilson et al. . |
| 5,345,504 | 9/1994 | West, Jr. . |
| 5,347,581 | 9/1994 | Naccache et al. . |
| 5,359,332 | 10/1994 | Allison et al. . |
| 5,373,557 | 12/1994 | Diehl et al. . |
| 5,379,045 | 1/1995 | Gilbert et al. . |
| 5,565,909 | 10/1996 | Thibadeau et al. ........................ 348/9 |
| 5,636,122 | 6/1997 | Shah et al. ........................ 364/449.1 |

*Primary Examiner*—Don N. Vo
*Attorney, Agent, or Firm*—Kerkam, Stowell, Kondracki & Clarke, P.C.; William L. Feeney

[57] ABSTRACT

An integrated receiver decoder (IRD), commonly called a set-top box, has a global positioning system (GPS) receiver. The GPS receiver checks to see if the IRD is at an authorized location and allows descrambling of video signals only if the location is authorized. A central access control system, remote from the customers/viewers, has a high quality GPS receiver and sends some GPS data in the transmission medium used to send video signals to the customers. The set-top box, referred to as a customer access control, establishes different geographic restrictions on different of various video signals. Location-specific signals require that the set-top box be at a single fixed location for descrambling. Region-specific signals are accessible only if the set-top box is in a geographic region authorized for reception, there being several such regions. Large area signals are accessible anywhere within a large area including the regions. Region-exclusion signals are accessible only if the set-top box is outside of one or more regions where reception is no allowed.

20 Claims, 14 Drawing Sheets

GPS TV SET TOP BOX WITH REGIONAL RESTRICTIONS

CROSS-REFERENCE TO RELATED APPLICATIONS

The present application is a continuation-in-part of U.S. patent application Ser. No. 08/437,424 of the present inventors entitled "TV Set Top Box Using GPS" filed May 5, 1995 and which issued as U.S. Pat. No. 5,621,793 on Apr. 15, 1997. That patent application is hereby incorporated by reference.

BACKGROUND OF THE INVENTION

The present invention relates to a video signal access control system, often referred to as a tv or television set-top box. More specifically, it relates to such a system where access to video signals from a remote source is allowed only if the system is in an authorized location. Additionally, access to some video signals is more restricted geographically than access to other video signals.

Set-top integrated receiver decoder (IRD) boxes are now being used to allow persons to directly receive subscription and pay video transmissions from satellites using small outdoor antennas. Decoder boxes may also be used for encoded or scrambled over the air video signals (i.e., broadcast from ground transmitter to customer/viewer without passing through satellite therebetween) or for cable (i.e., wire or optical fiber) video signals. (Since the functions of the set-top boxes can be realized also by components integrated into a television set, video cassette recorder, or other devices, the terms "customer access control" will be used herein for the components at the customer's location that control access.)

The satellite transmissions may be digitally compressed in order to accommodate many programs on a single carrier and multiple carriers on a single satellite. Many of the programs are authorized for distribution and reception only in certain geographic regions, particularly certain countries, where program rights have been obtained for their transmission and reception. Additionally, a set-top box may be authorized only for non-commercial personal use by consumers and not by hotels, theaters or other commercial activities. It is therefore useful for the operators of a video distribution system (whether satellite, over the air, or cable) that their set-top boxes are operable only at authorized locations and that the boxes inhibit authorization of program descrambling of the boxes at unauthorized locations.

Various patents have issued on IRDs. Although customer access controls such as decoders are usually separate from the television receiver (hence the common name set-top box), it should be understood that they could also be integral (in a common housing) with a television receiver, monitor, or video cassette recorder.

The following U.S. Patents, hereby incorporated by reference, only a few of which will be discussed below, are noted relative to access control for video signals or communications signals:

| Inventor | U.S. Pat. No. | Issue Date |
| --- | --- | --- |
| Teare et al. | 5,243,652 | Sept. 07, 1993 |
| Daniel et al. | 5,224,161 | June 29, 1993 |
| Cohen et al. | 5,282,249 | Jan. 25, 1994 |
| West, Jr. | 5,345,504 | Sept. 06, 1994 |
| Mason | 4,736,422 | April 05, 1988 |
| Jeffers et al. | 4,739,510 | April 19, 1988 |
| Mason | 4,802,215 | Jan. 31, 1989 |
| Kudelski et al. | 5,144,663 | Sept. 01, 1992 |
| Leduc et al. | 5,208,856 | May 04, 1993 |
| Wilson et al. | 5,295,188 | Mar. 15, 1994 |
| Naccache et al. | 5,347,581 | Sept. 13, 1994 |
| Diehl et al. | 5,373,557 | Dec. 13, 1994 |

The Teare patent shows use of a global position system (GPS) receiver to authorize release of an encryption key only when a location versus time track corresponds to a proper use. If the key is released, it allows the remote unit to view a scrambled video tape, which tape is at the remote unit. The remote unit is in an airplane which is allowed to show the video tape when it is in a given location or country and its position changes are consistent with the anticipated flight path.

Daniel shows video descrambling using a smart card and a pseudo-random generator.

Cohen discloses video descrambling using a smart card.

West shows cable television access regulated by a jamming signal.

In other developments, the NAVSTAR GPS achieved full initial operating capability in 1993 and provides precisely timed radio frequency signals from twenty-four orbiting satellites. A GPS receiver utilizes the transmission delay time from multiple orbiting satellites to make a determination of the position of the GPS receiver. The receiver must have a clock with good short term accuracy to lock onto and track a code message sent by a GPS satellite and further to make accurate pseudo-range measurements. A time-offset error between the highly accurate atomic standard clock in each satellite and a receiver can be removed by operating on the signal codes sent from four satellites rather than just three. The extra satellite signal permits a mathematical solution for the time offset as well as the ranges between satellites and receiver.

Some GPS receivers presently cost only a few hundred dollars, making them satisfactory for ships, aircraft and other vehicles where position determination is desired. The GPS receiver includes a microprocessor to perform calculations on measured data, special circuitry to calculate correlations, and requires a visual display, packaging, power supply, etc. Some of these items are already in the set-top box for other purposes and other functions can be simplified by performing a portion of the processing at the up-link site and transmitting the results along with commands over the same communication system providing the video, audio and data programming to the IRD's. The complexity of the IRD processing to accommodate the physical position validation can then be reduced to a level where the cost of electronic circuitry to implement these functions is acceptably small.

In the normal operation of a GPS receiver time-of-arrival measurements of code-division multiplexed radio signals from multiple GPS satellites are made by the receiver. These measurements are then converted to pseudo-range measurements using the radio wave propagation velocity. The range measurements are called pseudo-range because of a time bias error introduced by imperfect receiver time synchronization with the satellites' precise timing controlled by atomic clocks. The time bias is treated as an additional variable in the position calculations and one additional pseudo-range measurement is made to provide an additional equation to solve for this additional variable. Although the calculations to be performed are straight forward, a position solution must be iteratively calculated to converge on a solution. Additionally, corrections must be calculated for propagation effects in order to produce accurate position determination as normally required for airplanes, ships, boats, or other vehicles.

The following U.S. Patents, hereby incorporated by reference, show various GPS receivers and/or methods:

| Inventor | U.S. Pat. No. | Issue Date |
| --- | --- | --- |
| Holmes et al. | 4,807,256 | Feb. 21, 1989 |
| Allison et al. | 5,359,332 | Oct. 25, 1994 |
| Gilbert et al. | 5,379,045 | Jan. 03, 1995 |

OBJECTS AND SUMMARY OF THE INVENTION

Accordingly, it is a primary object of the present invention to provide a new and improved video signal access control system.

A more specific object of the present invention is to provide a video signal access control which authorizes access to the signal only if the customer access control is at the authorized location.

A further object of the present invention is to provide customer access control using position wherein a GPS receiver is utilized.

A further object of the present invention is to provide customer access control wherein access to different signals can be restricted geographically to a given region.

A still further object of the present invention is to provide customer access control wherein access to different signals can be restricted geographically to different degrees. For example, some signals are accessible over a large area, whereas other signals are accessible only in a particular limited region. Other signals are excluded from access in certain regions.

A further object of the present invention is to provide customer access control using position wherein a GPS receiver is utilized.

Yet another object of the present invention is to provide simple, low cost customer access control using position wherein a simple GPS receiver or a single channel GPS receiver is utilized, such a receiver being suitable for authorization at a single fixed location.

A further object of the present invention is to provide video signal access control using a central access control at a source of the video signals and remote from the customers.

Yet another object of the present invention is to provide a video signal access control system having central access control using a GPS receiver and wherein the central access control supplies position information to the transmission medium for transmission to customers.

A further object of the present invention is to provide a video signal access control system using multiple criteria for authorization including location and other factors such as payment for service, no black out (i.e., blocking of signal) resulting from parental restrictions on programming available to children, and no black out resulting from regional restrictions (e.g., sports event may be shown in areas only outside of the city, area, or state in which the event takes place).

Yet another object of the present invention is to provide a video signal access control system wherein a customer access control at a customer's place does not need the ability to transmit information to a central access control and does not need a central access control which sends a descramble key or otherwise responds to communications from the customer access control.

A still further object of the present invention is to provide a video signal access control system having a customer access control at a customer's place, wherein the customer access control is highly resistant to attempts to defeat access control.

It is desirable to have each and every set-top box perform signal descrambling only if it is physically located where it has been authorized. A system is herein described which uses the existing NAVSTAR Global Positioning System (GPS) to aid in validating the location of each set-top box and authorizing it to descramble program services ordered by the consumer, along with other criteria including payment for services, only if it is physically located where it was authorized. As used herein, GPS shall mean a system using a plurality of radio transmitters at different locations and a receiver which uses transmissions from the transmitters to determine or validate the location of the receiver. Of special concern is the ability of a position determining device within the set-top box to not be defeated by someone wishing to use the box at an unintended location. The system herein is resistant to insertion of false data which would cause the position to be determined as the one authorized while existing at an unauthorized position. Finally, it is required that the position determining device be a inexpensive as possible.

The present application addresses further geographic requirements beyond the single fixed location requirement of the preferred embodiment in the parent application. The present invention provides methods of implementation for a flexible set of geographically restrictive conditions of reception of satellite broadcast signals. These conditions may be associated with certain program distribution rights connected with certain specific programs and these rights cover certain geographic areas, or conversely they may exclude certain geographic areas. As an example of programming which can cover only a specific geographic area, television networks authorize each of their network affiliated stations use of the network material only in a specific geographic area, usually a region around a specific city. Separate contractual arrangements are made with different entities for different geographic areas. As a result it is not permissible for one entity to broadcast its signals into the region of another entity. Although these conditions of geographically restricted zones are contractual, the usual case of terrestrial broadcast transmitters generally will be geographically limited simply as a result of the transmitter. That is, a terrestrial transmitter transmits a signal which is receivable only in a reception area sufficiently near to the transmitter. However, when the broadcast transmitter is on a satellite a similar contractual geographic limitation may hold. That is, the satellite transmitter which re-broadcasts the signal of the terrestrial transmitter may be similarly restricted by an existing legal contract. Signal reception of a terrestrial broadcast transmitter is physically limited in distance from the transmitter by earth curvature. The signal reception area for a satellite transmitter is determined largely by the satellite's transmitting antenna beam pattern which often covers a whole country, or more. Satellites may provide spot beams, which cover narrower regions on the earth than normal satellite transmission patterns. However, such spot beams still usually cover a wider area than do terrestrial transmitters. An additional mechanism is required to cause the coverage area of the satellite transmitter to more closely coincide with that of the terrestrial transmitter. The customer access control or Set-Top box employing GPS can be made to provide this additional mechanism.

The present invention may be described as a video signal access control system comprising a customer access control operable at a customer location and having:

a signal input to receive at least one video signal from a remote source;

a video signal processor operably connected to receive video signals from the signal input;

a conditional accesser operably connected to the video signal processor;

a signal output operably connected to the video signal processor and providing a useable video output signal only upon the conditional accesser authorizing access to one or more video signals from the remote source;

a GPS signal receiver operable at the customer location to receive position information from remote sources and operably connected to the conditional accesser, the conditional accesser authorizing access only if the GPS signal receiver receives signals consistent with the customer access control being at an authorized location; and a region comparer to compare a region code received with the at least one video signal from the remote source with a region index stored at the customer location and operable to output a region comparer output, the region code being representative of a geographic region authorized to receive a signal and the region index being representative of a geographic region of the customer access control, there being different region codes for different geographic regions; and wherein the conditional accesser receives the region comparer output and conditions access to a given one(s) of the video signals from the remote source upon the region comparer output indicating that those given one(s) of the video signals are authorized for an access region of the customer access control.

The conditional accesser authorizes access only if the GPS signal receiver receives signals consistent with the customer access control being at a single fixed location authorized for service.

The conditional accesser authorizes access to signals known as location-specific signals only if the GPS signal receiver receives signals consistent with the customer access control being at a single fixed location authorized for service; and wherein the conditional accesser authorizes access to signals known as regional signals, even if the GPS signal receiver receives signals inconsistent with the customer access control being at a single fixed location authorized for service, provided that the region comparer output indicates that the video signals are authorized for the access region of the customer access control.

The access region of the customer access control is an access region in which the customer access control is actually located as sensed by use of the GPS signal receiver and the region index represents the region in which the customer access control is actually located.

The access region of the customer access control is an access region in which the customer access control is authorized for placement and the region index represents the region in which the customer access control is authorized for placement.

The conditional accesser authorizes access to signals known as location-specific signals only if the GPS signal receiver receives signals consistent with the customer access control being at a single fixed location authorized for service; and wherein the conditional accesser authorizes access to signals known as regional signals, even if the GPS signal receiver receives signals inconsistent with the customer access control being at a single fixed location authorized for service, provided that the region comparer output indicates that the video signals are authorized for the access region of the customer access control.

The access region of the customer access control is an access region in which the customer access control is actually located as sensed by use of the GPS signal receiver and the region index represents the region in which the customer access control is actually located.

Alternately, the access region of the customer access control is an access region in which the customer access control is authorized for placement and the region index represents the region in which the customer access control is authorized for placement.

The video signal access control system may further include a central access control remote from customers and operable to transmit the region index for each customer such that the region index for that customer is stored in the customer access control; and wherein the region index represents the region in which the customer access control is authorized for placement.

The customer access control includes a region determiner that is supplied GPS data from the GPS signal receiver and is supplied boundary data corresponding to boundaries of one or more of several access regions, the region determiner outputting the region index based on the access region in which the customer access control is actually located as sensed by use of the GPS signal receiver and the region index represents the region in which the customer access control is actually located.

The customer access control is operable in different ones of a plurality of access regions, the customer access control granting access to signals corresponding to each access region when the customer access control is in that region.

A large area includes the plurality of regions and wherein the conditional accesser authorizes access to signals known as large area signals provided that the customer access control is within a large area including a plurality of the regions. The large area includes, in addition to the plurality of regions, an open zone; and wherein the conditional accesser authorizes access to signals known as region-exclusion signals provided that the customer access control is within the large area and outside of one or more of regions where the particular signal is excluded.

The conditional accesser authorizes access to signals known as region-exclusion signals provided that the customer access control is within the large area and outside of one or more of regions where the particular signal is excluded. The customer access control is a non-transmitting unit.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

Figure 1:
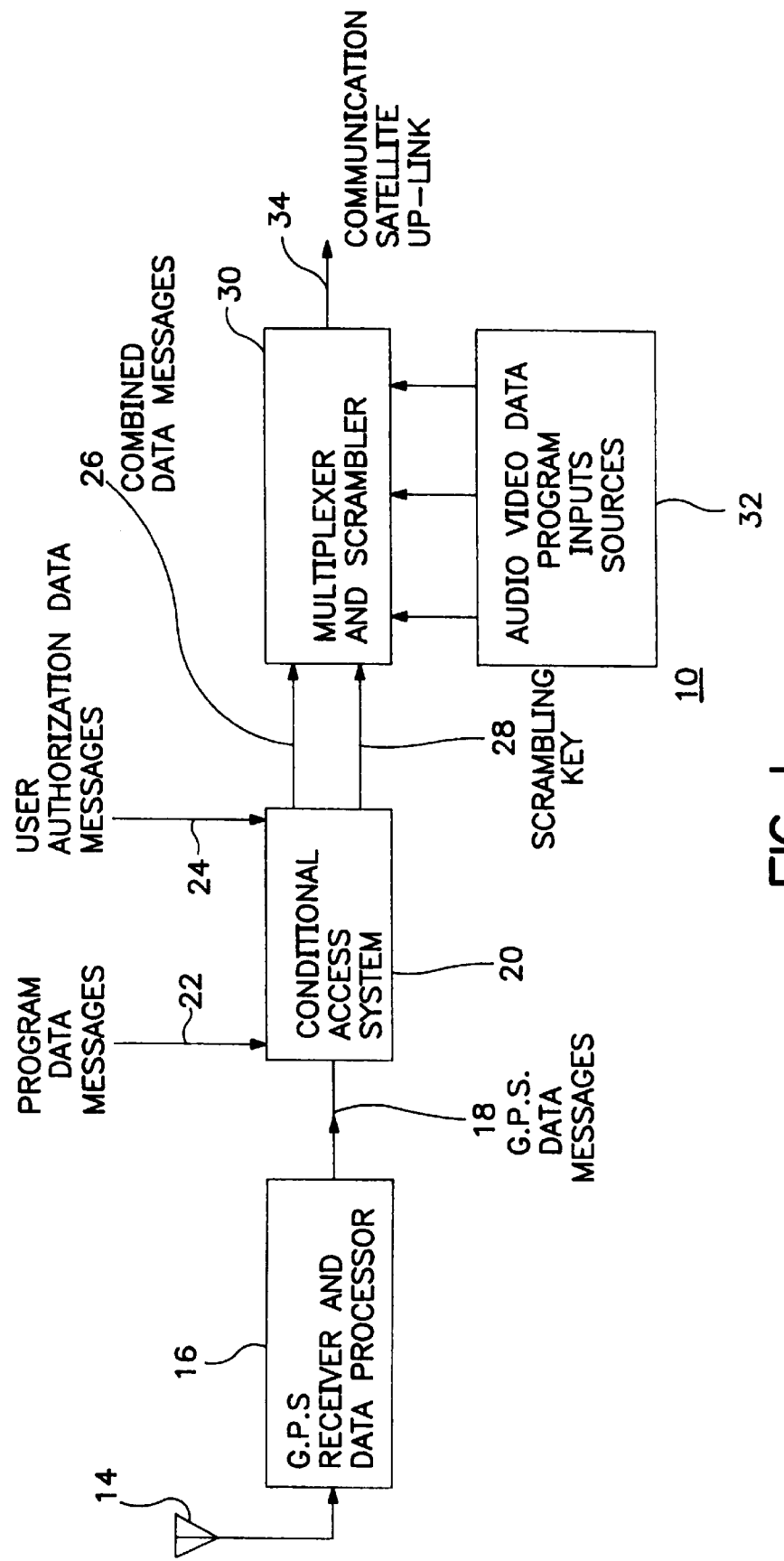
FIG. 1 is a simplified block diagram of a central access control used with a video signal access control system according to the present invention.
Figure 2:
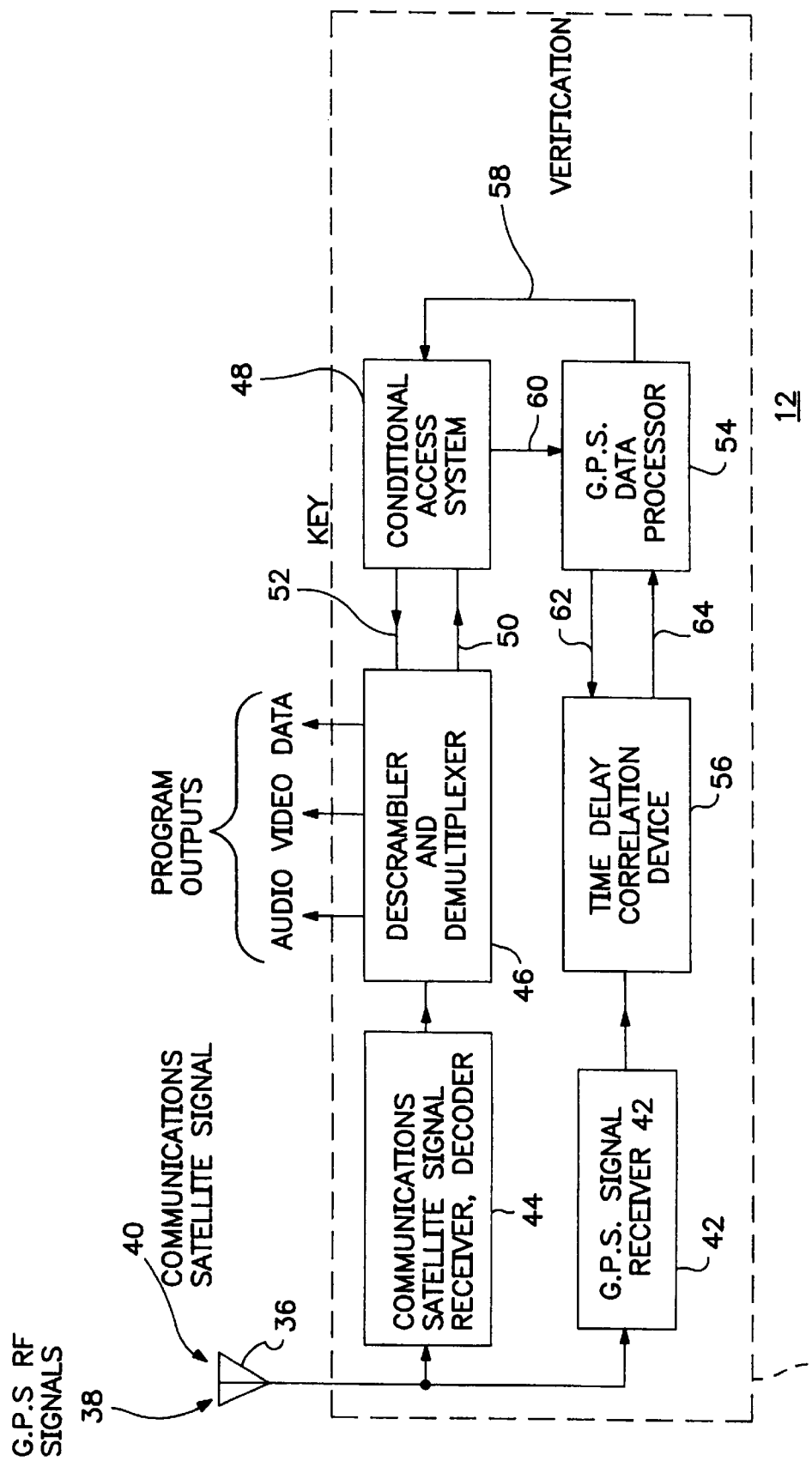
FIG. 2 is a simplified block diagram of a customer access control used with the video signal access control system.

With reference to FIGS. 1 and 2, a video signal access control system includes a central access control or system 10 of FIG. 1 and a customer access control or system 12 of FIG. 2.

The central access control 10 is remote from customers who subscribe to the various programs. An antenna 14 receives global positioning system (GPS) information from GPS satellites (not shown) and is connected to a central (i.e., remote from the customers/subscribers) GPS receiver/data processor 16, which may operate in known fashion to provide GPS data messages 18 to a central conditional access system or control 20. Specifically, GPS receiver/processor 16 is preferably a code division multiplex multiple channel receiver. The received signals are all at the same radio frequency, but each GPS satellite's signals has a different repeating code which differentiates it from the other signals.

GPS receiver/processor 16 is a high quality standard unit, but it determines which GPS satellites are best to use for position fixing at the sites where the customer access control systems 12 are. That is, a normal GPS receiver determines which satellites it should be using for position determination. GPS receiver/processor 16 will instead determine which satellites should be used at customers' sites. If the geographic coverage area of the various customers' sites is sufficiently large, GPS receiver/processor 16 will provide multiple determinations for different regions. For example given geographic regions A and B, the best satellites for receiving GPS data in region A may be different at a given time from the best satellites for receiving GPS data in region B. Accordingly, GPS receiver/processor 16 may, using a known central or median geographic location in region A, readily determine the best satellites for receiving GPS data in region A. Likewise, GPS receiver/processor 16 may, using a known central or median geographic location in region B, readily determine the best satellites for receiving GPS data in region B.

Given knowledge of the location of such central or median geographic location of a given region, known techniques readily allow determination of the best satellites to use at a given location.

The transmitters of the GPS satellites send 50 bit-per-second data superimposed on their output signals which are so called Gold codes (named after an individual) corresponding to a particular satellite. As known, these Gold or GPS codes are usually one mega-chip per second codes. The data is decoded to using known techniques to determine the precise position and velocity (vector) information, collectively called ephemeris data, of each satellite which will be used for verifying or determining location of the customer access control system 12 in a manner discussed in detail below. (As readily known, the velocity vector is the time rate of change of the position vector.) The correction data for the expected velocity of propagation is also decoded in known fashion.

GPS data messages 18 (i.e., signals on electrical connection lines 18), including the position, velocity, and correction data relative to the various satellites, are supplied by receiver/processor 16 to a central conditional access system 20, which may also be called a central conditional accesser. Depending on the bandwidth at the output of system 10 and other considerations, the GPS data messages 18 may simultaneously include data on all satellites used for all regions or time multiplex data from one satellite and/or groups of satellites (e.g., all satellite data from satellites used for region A for a short interval followed by all satellite data from satellites used for region B for a short interval). In the example with regions A and B, the data from satellites to be used for region A can be addressed to the various customer access control systems 12 (FIG. 2 only) within region A, whereas the data from satellites to be used for region B can be addressed to the various customer access control systems 12 within region B.

System 20 also receives program data messages 22 and user authorization data messages 24 supplied by sources (not shown) in a known fashion. Central conditional access system 20 supplies combined data messages 26 (the various inputs to system 20 output in encrypted form) and a scrambling key 28 to multiplexor/scrambler/transmitter 30, which may be called an output unit. The output unit 30 receives audio, video, and data signals from program sources 32 and which supplies outputs 34 to a transmission medium. In known fashion, the outputs 34 include scrambled versions of the various audio, video, and data program signals. The outputs 34 also incorporate the data input to system 20, this being placed on the transmission medium in an unscrambled, but encrypted form. The combined data messages 26 and outputs 34 would incorporate the various GPS data as discussed and using known techniques.

Although the outputs 34 are shown as being provided to an up-link for a communication satellite, the outputs could be applied to any transmission medium for transmission (directly or indirectly) to customers. For example, the central access control system 10 may alternately supply the outputs 34 over the air (non-satellite televisions broadcast)

and/or by cable (wires or optical fiber). In any case, the signals will be scrambled and descrambling will only take place if one of the customer access control systems 12 of FIG. is at an authorized location as discussed below.

The multiplexer/scrambler/transmitter 30 may be, for example, a standardized MPEG2 system multiplexer which operates on a packet basis, receiving audio, video, and data packets and combining them into a formatted serial data stream to issue to the communication satellite up-link. As well known, MPEG2 is a particular digital video compression system or technique which accommodates multiple video, audio, and data signals to be combined and transmitted on a single radio frequency carrier.

By having the important features related to the high quality, multiple channel GPS receiver/processor 16 at the system 10, the system 12 discussed below can be simpler than otherwise. Specifically, the advantageous feature of retransmitting the discussed GPS data, while not a necessary part of the present invention in its broadest respects, allows for a much simpler and less expensive system 12. Since a customer access control system 12 must be at each customer/subscriber location, it is useful to hold down costs and complexity of the customer access control system 12, whereas making the central access control system 10 more complex does not involve great expense since there would only be one or a relatively low number. Since the conditional access system 20 operates in known fashion (except for receiving and incorporating in its output the GPS data messages 18), details of the system 20 including components of known conditional access systems which ordinarily cause the scrambling keys to be changed and to be de-codable by authorized IRDs (such as the customer access control system 12) need not be shown or presented.

As an alternative to the transmission of the described GPS data, system 10 may alternately send only the identity of the satellites to be used by the customer access control 12, instead of including the position and velocity information. However, that would require more complex operations by the customer access control 12.

Turning now to the customer access control system 12 of FIG. 2, an antenna 36 receives both direct (i.e., not relayed from a central system such as 10 of FIG. 1) GPS signals 38 from a satellite and communications satellite signals 40 which include the indirect (i.e., relayed through central system 10) GPS signals and correspond to signals 34 of FIG. 1 following their up-link to one or more communications satellites and down-link to the customer access control system 12. In theory, the same satellite (not shown) could provide both some direct GPS signals and the communications signals 40, but satellites usually do not combine GPS and communications functions. The antenna 36 may be a small satellite dish type antenna. Although not shown, separate antennas for direct GPS signals and for communications signals could be used instead of the single reception antenna 36.

The signals received by antenna 36 are sent to an integrated receiver decoder (IRD) 37 and are filtered (filter not shown) using known techniques such that the is direct GPS signals 38 go to GPS signal receiver 42 and the communications signals 40 go to the communications satellite receiver/decoder 44 (which serves as a signal input device). The output of receiver/decoder 44 is a demodulated and decoded baseband signal corresponding to the signals 34 of FIG. 1 and this output is supplied to descrambler/demultiplexer 46. The descrambler/demultiplexer 46 operates in known fashion to de-multiplex and direct signal packets for a customer conditional access system 48 along a connection 50 to the customer conditional access system 48. Packets corresponding to program audio, video, and data are descrambled by component 46 if a descramble key is supplied at connection 52 by the system 48. The system 48 provides the correct descramble key only if all the criteria for authorization are satisfied. Known IRDs allow access upon satisfaction of criteria based on the program data messages 22 and user authorization data messages 24 of FIG. 1. Common or standard operational details of known components 44, 46, and 48 need not be discussed, but having GPS data as one of the criteria for release of the descramble key and other aspects in which components 44, 46, and 48 differ from the usual prior systems will be emphasized hereafter.

The system 12 will not have the conditional access system 48 release the correct key on 52 unless (in addition to criteria based on other factors such as payment for service, no black out resulting from parental restrictions on programming available to children, and no black out resulting from regional restrictions) the IRD 37 is at its authorized geographic position. Whether it is in proper geographic position is determined by a GPS data processor 54 connected to GPS signal receiver 42 by way of a time delay correlation device 56. Processor 54 performs calculations of pseudo-range and time bias as discussed hereafter and will provide a position authorized binary signal on line 92 only if the geographic position of IRD 37 is consistent with the expected or previously authorized location.

The GPS processor 54 works in conjunction with the time delay auto-correlation device 56. Device 56 uses a known comparison technique involving a locally generated code for the satellite which is to be used. (The satellites to be used are supplied by the indirect GPS data and passed on line 60 to processor 54.) The locally generated code is supplied on line 62 to device 56 for shifting in time until it matches in time the same code transmitted from the GPS satellite. The value of time shift is then passed back to the processor 54 on line 64 for pseudo-range calculations using the ranging equation:

$$(X_s-X_i)^2+(Y_s-Y_i)^2+(Z_s-Z_i)^2=(R-R_b)^2$$

where $X_s$, $Y_s$ and $Z_s$ represent satellite position coordinates and $X^i$, $Y_i$, and $Z_i$ represent position coordinates of the IRD 37. The range between the satellite and the IRD 37 at a particular time is represented by R, whereas $R_b$ is the range bias due to the IRD clock (not separately shown) instability.

Since the indirect GPS data preferably supplied to IRD 37 includes satellite position coordinates at a given time and the three velocity components at that time, $X_s$, $Y_s$ and $Z_s$ may be readily determined by processor 54 at a later (relatively short time delay) time. Alternately, if a more complex IRD is used, the direct GPS data can generate these values independent of any indirect GPS data other than the identity of the satellites to be used.

Evaluating the ranging equation for two different satellites (doing the equation twice) allows one to check for consistency with an authorized location. As used herein, such a consistency check shall be referred to as position validation. Considering that $X_i$, $Y_i$, and $Z_i$ representing position coordinates of the IRD 37 may be taken as at the authorized location meaning that the proper range R will be known, a first application of the equation yields a value for $R_b$, the range bias due to offset of the IRD clock from the satellite clock. A second application of the equation is then performed by processor 54 using a different satellite to check if the right and left sides of the equation are equal. If the right and left sides of the equation are equal, the range is proper and the position is highly likely to be valid since an equal range is unlikely. (Even if a range is equal to the proper range at a given moment, movement of the IRD satellites means that shortly thereafter, the range will be invalid unless the IRD is at an authorized position.) If the right and left sides of the equation are not equal, processor 54 will not supply the verification on line 58 such that conditional access 48 does not provide the descramble key on line 52 and usable program output(s) are not supplied by component 46.

Instead of simply validating the IRD position as described above, an alternative has the IRD 37 operate in a position determination mode. In this mode, the equation above is calculated four times to solve for four unknowns: range bias $R_b$ and $X_i$, $Y_i$ and $Z_i$ representing position coordinates of the IRD 37. A Taylor series or other known iterative technique can be used to solve for the four unknowns. The determined IRD position coordinates may then be compared to previously stored authorized IRD coordinates. If they are equal (or within a given tolerance range), the verification will be supplied on line 52. If they are not equal (or not within a given tolerance range), the verification is not supplied such that conditional access 48 does not provide the descramble key on line 52 and usable program output(s) are not supplied by component 46.

The advantage of using the position validation technique is that it may be simpler (with associated lower costs and less processing power needed) than having position determination in the IRD. An advantage of IRD position determination is that it may be used for self-initialization at the customers site. That is, the authorized location can be initialized where the customer first sets up the IRD. This will avoid the need for the company providing the IRD to determine and initialize the IRD values for proper location. This prevents descrambling at other locations, but the company may still need to check somehow to insure that the customer did not initially take the IRD to an unauthorized location. On the other hand, this technique of self-initialization of the position may be quite useful if an employee of the company delivers the IRD to the customer.

Figure 3:
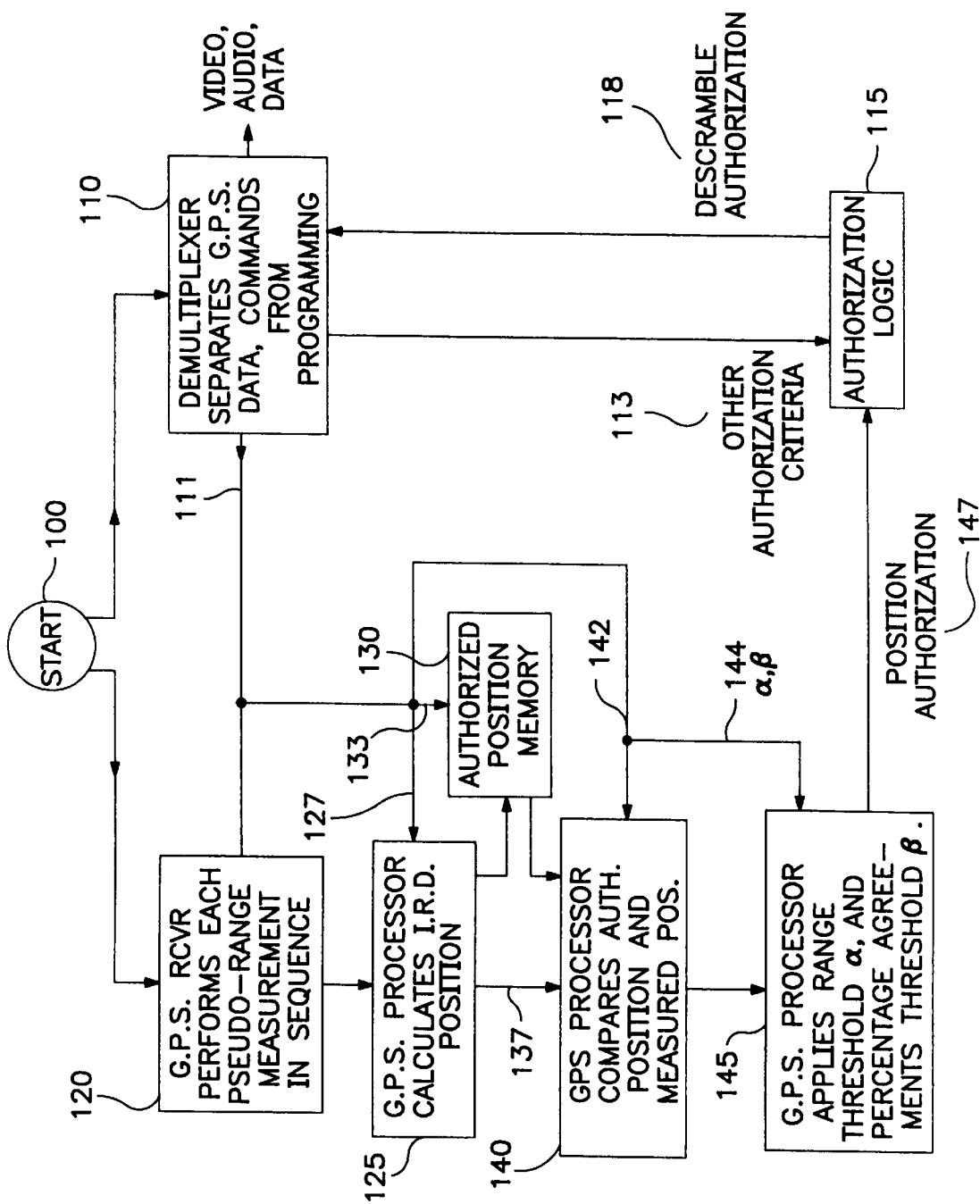
FIG. 3 is a flow chart of a first embodiment customer access control which calculates its position.
Figure 4:
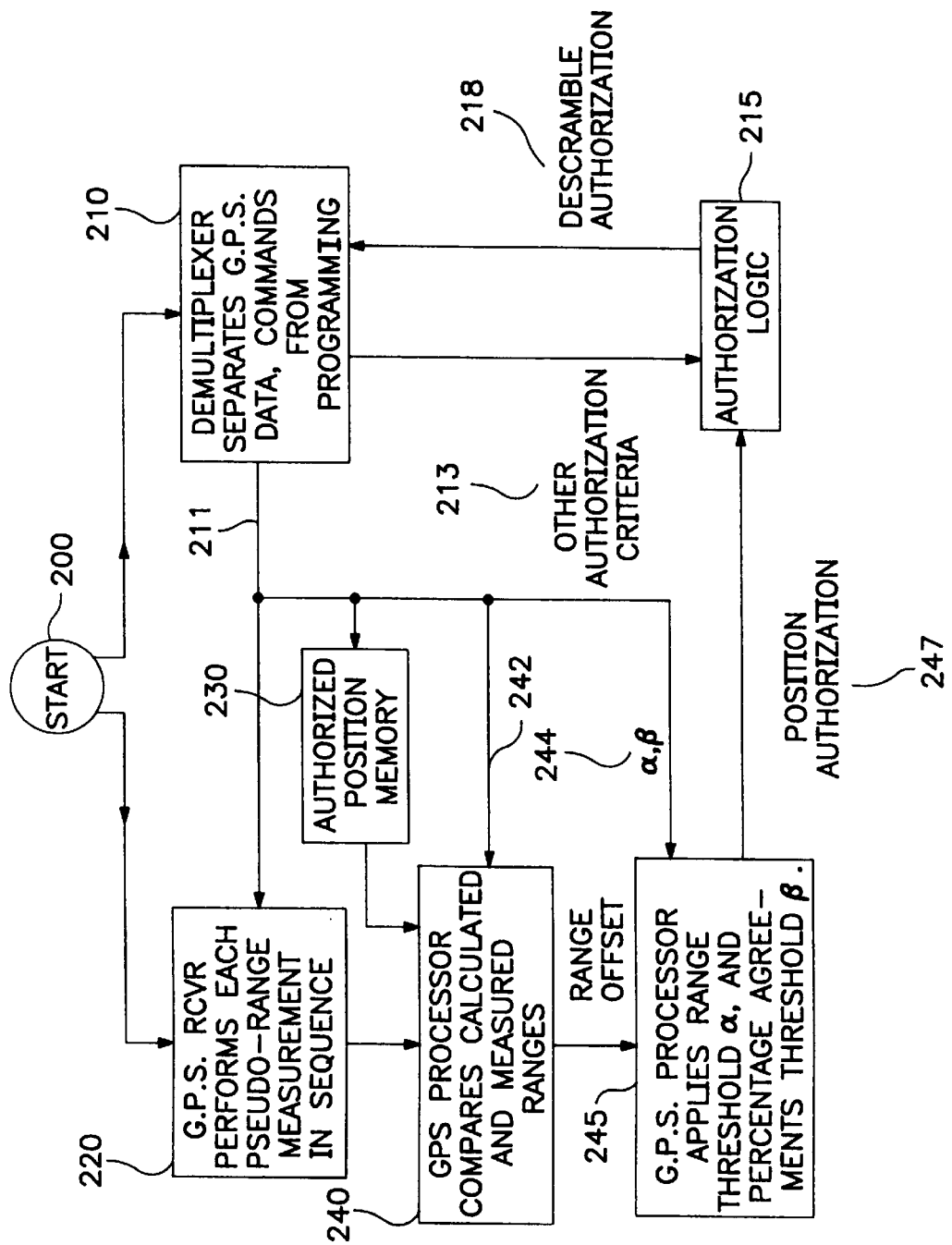
FIG. 4 is a flow chart of a second embodiment customer access control which validates its position.

Still further details are shown in FIG. 3 of a first embodiment. The processing shown herein is limited to the operation of the GPS and its interface with the MPEG2 or other programming delivery system. Included in this embodiment is the GPS processing of four pseudo-range measurements to explicitly determine the IRD position. FIG. 4 differs from FIG. 3 in that the GPS processing in the IRD in FIG. 4 performs only a range validation (which, over time, is position validation) after the programming delivery system has supplied the IRD with the GPS coordinates of the authorized location.

In FIG. 3 start block 100 leads to block 110 where the demultiplexor provides that portion of the programming signal which is directed to GPS commands and data at line 111 supplied to block 120. At block 120, the GPS receiver receives the command from the lines 111 (this could be by way of the conditional access system of FIG. 2) to perform a pseudo-range measurement and identify the particular GPS satellite. At 120, the receiver performs the correlations required to obtain the pseudo-range and passes the pseudo-range to the GPS processor at block 125. The GPS coordinates of the GPS satellite used for the measurement are delivered from demultiplexor block 110 at input 127 of block 125. Delivery via the programming channel aids the system in that the GPS receiver 42 of FIG. 2 need not necessarily demodulate this data from the GPS signal directly and is therefore able to quickly move on to the next GPS satellite signal to be processed. It also avoids a need for the GPS receiver requiring more than a single GPS signal to be processed at a time, thus saving on the amount of hardware required.

At the time of IRD initialization a first position determination is stored in an authorized position memory as indicated at block 130 via data path 135. Subsequent position determinations will compare new position determinations with the position stored in memory. This comparison is performed in block 140 wherein the present measured position is received from the GPS processor 54 of FIG. 2. The authorized position is normally received via path 138. However, the system allows a position check to be made with a position communicated via the programming channel via path 142. The system operator has the choice of validating the position with reference to a position he sends to the IRD if he desires. This system of FIG. 3 is capable of making an initial position determination by itself so that it need not be provided over the programming channel. The ability to later validate this initial position provides insurance that the initial position measurement was made at the authorized location and not at some unauthorized location.

The output of block 140 is the range error between the currently measured position and the authorized position and is delivered to block 145. Block 145 performs processing which first determines if the range error is less than a prescribed threshold value, alpha.

The value of alpha, and also the later used threshold, beta, is provided from the programming channel via path 144. A binary result from this operation occurs such that a "one" is produced for a range error equal to or less than alpha and a binary zero is produced for a range error which exceeds alpha.

So that any single range error produced by the GPS measurement process will not disable the IRD from descrambling the program material a second threshold value called beta is used. This process requires that a pre-determined percentage of the range errors are within the threshold alpha. Said pre-determined percentage is governed by the threshold value of beta.

The output of processing block 145 is the binary position authorization signal at 147. The signal at 147 is one input component to the authorization logic block 115. Other authorization criteria are delivered to 115 via path 113. The logic in block 115 essentially requires that signal 147 authorize descrambling, along with the other criteria of 113 for the descramble authorization 118 to be asserted and allow the programming to be viewed.

The logic block 113 is more complex than a simple AND gate in that the programming channel can cause the descramble authorization to be enabled or disabled regardless of the state of position authorization signal 147. This gives the system flexibility to not require position verification in some instances.

A further capability of this system permits certain geographic areas to be excluded from providing a position authorization. In this case the demultiplexor 110 provides the excluded area in terms of GPS coordinates to processor 140 via path 142. Processor 140 then compares the excluded area with the position held in memory 130. If the position in memory 130 is within the excluded area sent via path 142, then block 140 sends the maximum range error possible to block 145 which responds by not authorizing the position at its output 147.

FIG. 4 shows a second embodiment of the invention wherein the IRD does not make any position determinations.

In this embodiment only range verifications are performed utilizing pseudo-range measurements made at the IRD and an authorized position delivered to the IRD via the programming channel. An advantage of this embodiment is the saving in the hardware and software associated with the processing of pseudo-range measurements in an iterative fashion using four simultaneous non-linear equations. The GPS receiver operation 220 in FIG. 4 is the same as receiver operation 120 in FIG. 3. Also the same between FIGS. 3 and 4 are blocks 100 and 200, blocks 110 and 210, blocks 115 and 215, and blocks 145 and 245.

In particular in FIG. 4 block 230 involving the authorized position memory differs from that shown in FIG. 3 in that the authorized position can only be entered from the programming channel in FIG. 4, and that the processing in block 240 performs only range verifications. Processor 140 in FIG. 4 performs a range computation between the GPS satellite being measured and the IRD based upon the authorized position coordinates in memory 230 and the coordinates passed to it via path 242 from demultiplexor operation block 210. Alternatively, the GPS satellite position coordinates can be demodulated from the GPS data, but this requires that the single channel receiver, 220, remain synchronized with a single GPS satellite for a longer period of time. The result of the range calculation is then subtracted from the range determined from the measured data. This yields the range offset value directly which is the needed output to send block 245. The remaining processing in FIG. 4 corresponds to that already described in FIG. 3.

An important aspect of the invention is that the set-top box not be fooled into thinking it is at an authorized position when in reality it has been moved to an unauthorized position. The IRD may be in the hands of someone who wants to cause the GPS receiver to think it is receiving time delay measurements consistent with the authorized position but in reality is receiving artificial time delay measurements consistent with the authorized location but not its actual location. It must be assumed that the general design of the IRD will become known to those skilled in the art of electronic circuit design (following any commercial release of the IRD), particularly those with experience in set-top boxes and conditional access systems. If the set-top box is opened to expose the circuit components then electronic signals which travel between components such as integrated circuits can be readily observed with test measurement equipment. Further, it is possible to break certain connections and substitute other signals. With reference to FIG. 2, it can be seen that the authorization system shown could be readily defeated (absent a feature discussed below) by tampering with the verification signal 92. If the signal connection 92 to conditional access system 85 was broken and instead tied to the voltage level corresponding to correct position verification then the GPS system would be totally bypassed and its purpose defeated.

The set-top box system employing the GPS can be made resistant to tampering by placing all of the circuitry relating to the conditional access system and the GPS inside a sealed container. Such a container might be an integrated circuit or a smart card, for example. The container is designed such that an attempt to pen it for internal signal measurement purposes effectively destroys the container's internal circuitry. This implementation permits visibility of only encrypted data passing into the container and only the descrambling keys, which are rapidly changed, appearing at the output pins of the container. It is desirable to be able to renew the conditional access system should the security of the system be broken by one technique or another by the straight forward method of replacing only the smart card. However, it is relatively expensive to discard all of the GPS circuitry should it be co-located inside a replaced smart card. A method is next disclosed wherein certain of the GPS circuitry is located inside a sealed container such as a smart card and other parts of the GPS circuitry outside the sealed container. The circuitry parts outside the sealed container are not replaced when a smart card is changed.

Figure 5:
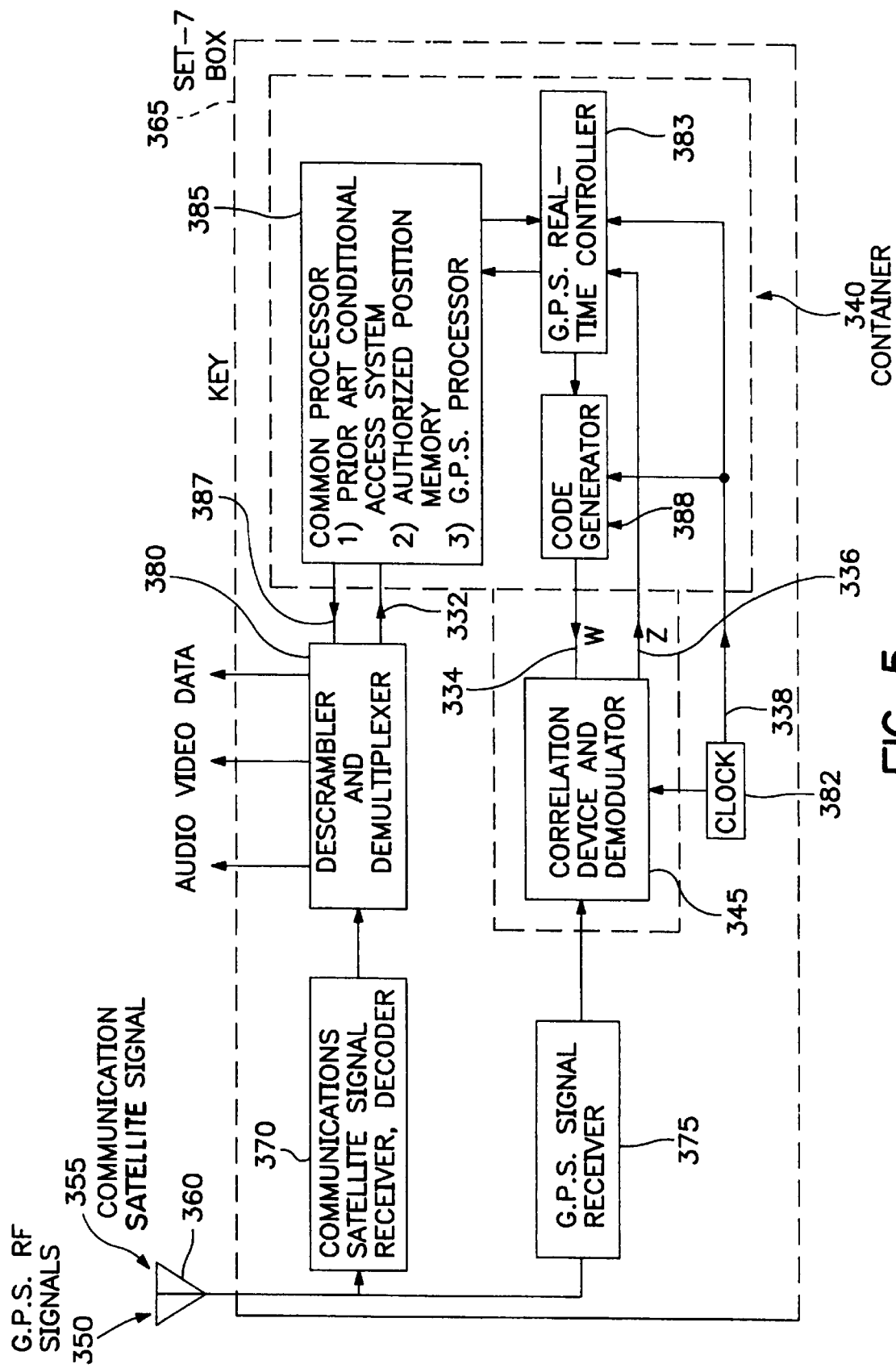
FIG. 5 is a block diagram of a customer access control having a tamper resistant feature which may use the techniques of either FIGS. 3 or 4.

FIG. 5 shows the method for using the GPS circuitry to resist defeat by tampering methods yet place certain portions of the GPS circuitry permanently in the set-top box which need not be replaced when a smart card is replaced. Several elements of FIG. 5 perform the same functions as in FIG. 2. Specifically, elements 350, 355, 360, 370, 375, 380 and 387 in FIG. 5 correspond to elements 38, 40, 36, 44, 42, 46, and 52 respectively in FIG. 2. Since the functions performed are the same, these elements will not be described a second time.

In FIG. 5 the dashed line, 340, shows the elements which are co-located inside of the sealed container. The signals which are visible passing into and out of the sealed container are as follows. First, the encrypted GPS and conditional access data 332 from the descrambler and demultiplexor 380 pass into container 340. Second, the stable clock 382, which resides in the set-top box or IRD, send signals to container 340 via path 338. This clock has sufficient short term stability to operate the GPS receiver processing system. Third, the key 387 for descrambling the video, audio and data programming exits the container. This key is the correct key only if all authorization criteria including the GPS position criteria have been met.

Next the baseband code W, 334, exits container 340 to operate correlation device and demodulator, 345. This is the one mega-chip per second GPS code corresponding to the code of one of the GPS satellites. It is a desirable countermeasure to place the circuitry which creates the code sequence corresponding to a particular GPS satellite inside the container. This has the effect of requiring the attacker of the system to determine which satellite is being interrogated by correlating the bit stream with several bit streams of GPS satellites which are visible. An additional problem for the attacker is to also measure the particular time delay of the code being used. These two processes require measurement equipment and measurement time. If the code generator 388 were outside of the container 340, it should be presumed that the attacker could readily determine the particular code and code time delay being used by the IRD. The attacker would be aided by observation of the code generator 388 state machine either directly or the loading word which is used to load a starting state into said generator. Since the GPS code generator uses the well known Gold codes to generate the matching satellite codes a knowledge of the state of the state machine provides the attacker the information as to the particular code being used. It is therefore desirable to hide the code generator 388 inside container 340.

It is beneficial from a security standpoint to also place the correlation device 345 in the container 340 in FIG. 5, this being illustrated by the dashed lines there around. This then precludes visibility of the code W, 334, and the output correlation result Z, 336, by the attacker. This provides a very high level of security relative to spoofing the GPS system. This embodiment of the invention can be used in a systems especially where container 340 is seldom removed from set-top box 365.

In a more cost sensitive embodiment and/or where container 340 can be expected to be renewed more often, the correlation device and demodulator 345 can be placed outside of the container 340. This permits the radio frequency (RF) processing in 345 to be performed outside the container 340, and removes the need for the RF signal from GPS signal receiver 375 to be passed through a connector pin of container 340. Further, it allows the local RF oscillator which is modulated by the code W, 334, and which hetrodynes the RF signal down to a frequency which can be demodulated by a Costas, or equivalent, phase locking loop and signal demodulator to be placed outside said container. To minimize the expense of the renewable portion of the IRD, the circuitry of block 345 would be placed in the IRD box 365 outside of said container.

Two methods of the invention to greatly reduce the visibility as to the GPS satellite being correlated with a locally generated code are next disclosed. The first method randomly changes the waveform W, 334 in FIG. 5, between the GPS satellites. In this way, the satellites are not addressed in any particular order which increases the difficulty of someone trying to spoof the system. Satellites which are not visible also are included so as to cause the attacker even more additional effort and confusion in trying to sort out what the IRD system is doing. It is practical to add such diverting tactics since the actual position does not need to be repeatedly validated with any great haste.

The second method involves the random order of testing specific time delays of a GPS code to a particular GPS satellite. This procedure will cause the successful time correlation between the locally generated code W, 334 in FIG. 5, and the signal from the GPS satellite to occur at random time intervals. The time correlation result, Z, 336 in FIG. 5, is reported back to the common processor 385 in container 340. This is the last of the five signals passing into or out of the container, 340. This signal is checked by said processor at all of the possible correlation result times to determine if a correlation match has or has not occurred. If a successful match occurs when it should not occur, or when it is inconsistent with the authorized IRD position, the processor registers an incorrect position. Thus the signal, Z, is dynamic in that successful correlations occur at random times. Also, times at which the processor expects no positive correlation are checked for the negative result. A positive correlation at a time when one is not expected is registered as an error.

Figure 6:
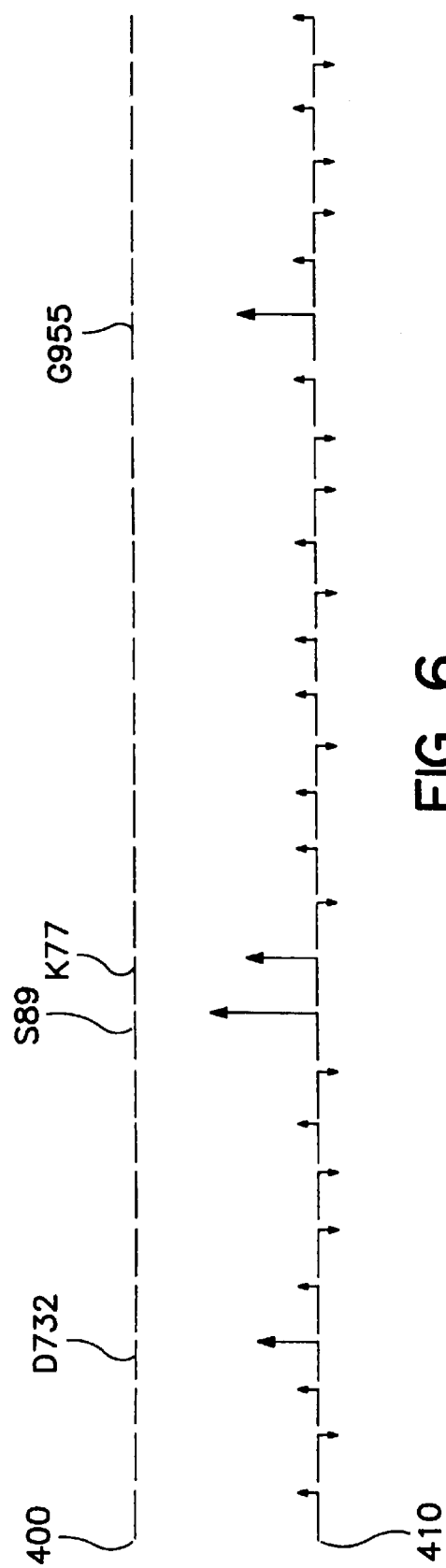
FIG. 6 shows a sequence of correlation results for different Gold codes generated in a portion of FIG. 5.

FIG. 6 shows a sequence of correlations wherein different Gold codes generated at W, 334 in FIG. 5, corresponding to actual different GPS satellites and to some fictitious satellites or satellites which are not currently visible on the same side of the earth are generated and the resulting correlations which are reported back via signal, Z, 336 in FIG. 5. The time line 400 in FIG. 6, represents time proceeding from left to right. The line is divided into a plurality of individual correlation periods. Four of these periods result in positive correlations and are labeled as D732, S89, K77 and G955 respectively. The letter in each designation corresponds to the particular GPS satellite. The number in each designation corresponds to the time delay used for the code of the GPS satellite. The other correlation periods in FIG. 6 do not result in positive correlations but include various time delays for the codes of other GPS satellites.

The time line 410 in FIG. 6 shows the results of the correlations performed along line 400 and show those resulting in positive correlations. These positive correlations corresponding to those periods along line 400 over which the satellite and time delay designations occur. Both the absence of a positive correlation and the presence of a positive correlation are checked and reported by signal Z, 336 in FIG. 5. Any person attempting to cause the authorized position to register with the processor 385 inside container 385 has to produce this randomly varying waveform.

In FIG. 5, a common processor 385 is shown, which carries out the tasks of storage of the authorized position in GPS coordinates and GPS processing, and known conditional access. The processor 385 works in conjunction with the GPS real time controller 383, to which the processor can provide instructions in terms of data words. The controller will implement the real time sequential operations according to states timed by the clock 338. Controller 383, processor 385, and code generator 388 could be implemented on the same integrated circuit chip for a minimum cost processor.

The above discussed figures are those shown and described in the parent application, whereas FIGS. numbered 7 and higher did not appear in the parent application. Those FIGS. will be discussed hereafter, it being understood that they complement the arrangements of FIGS. 1–6.

It will be understood that the preferred embodiment of the parent application provided a geographic restriction to a given single fixed location. The arrangements discussed hereafter are modifications to the customer access control or Set-Top box that allow some of the signals to be accessible with differing geographic restrictions. The arrangements provide the geographic restrictions on reception for satellite signals consistent with the various contractual restrictions for territory or regions associated with the signals. Three different arrangements or methods are next described which give the Set-Top box this capability with various degrees of flexibility.

Figure 7:
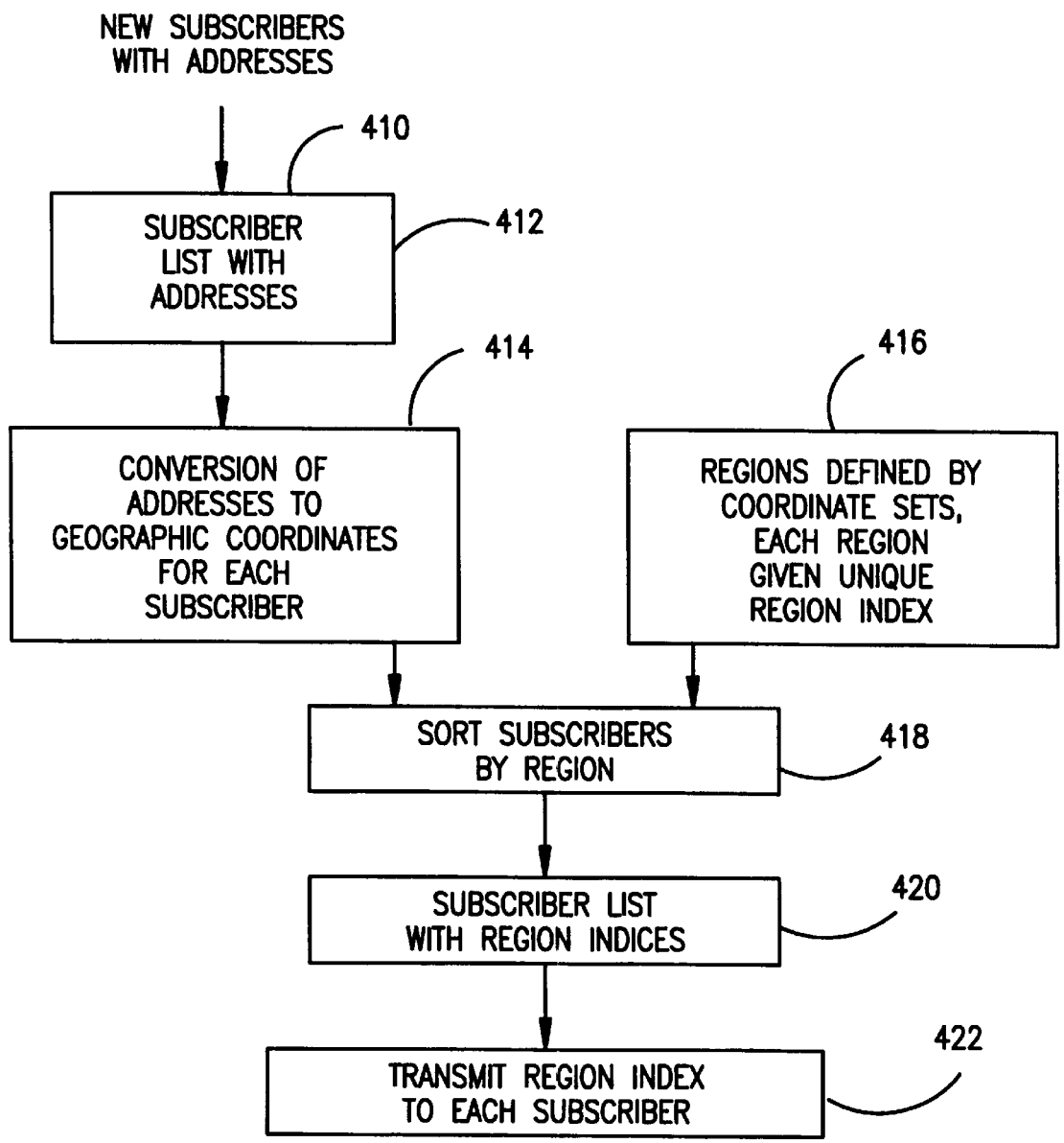
FIG. 7 is a simplified block diagram of a supplemental portion of the central access control of FIG. 1.
Figure 8:
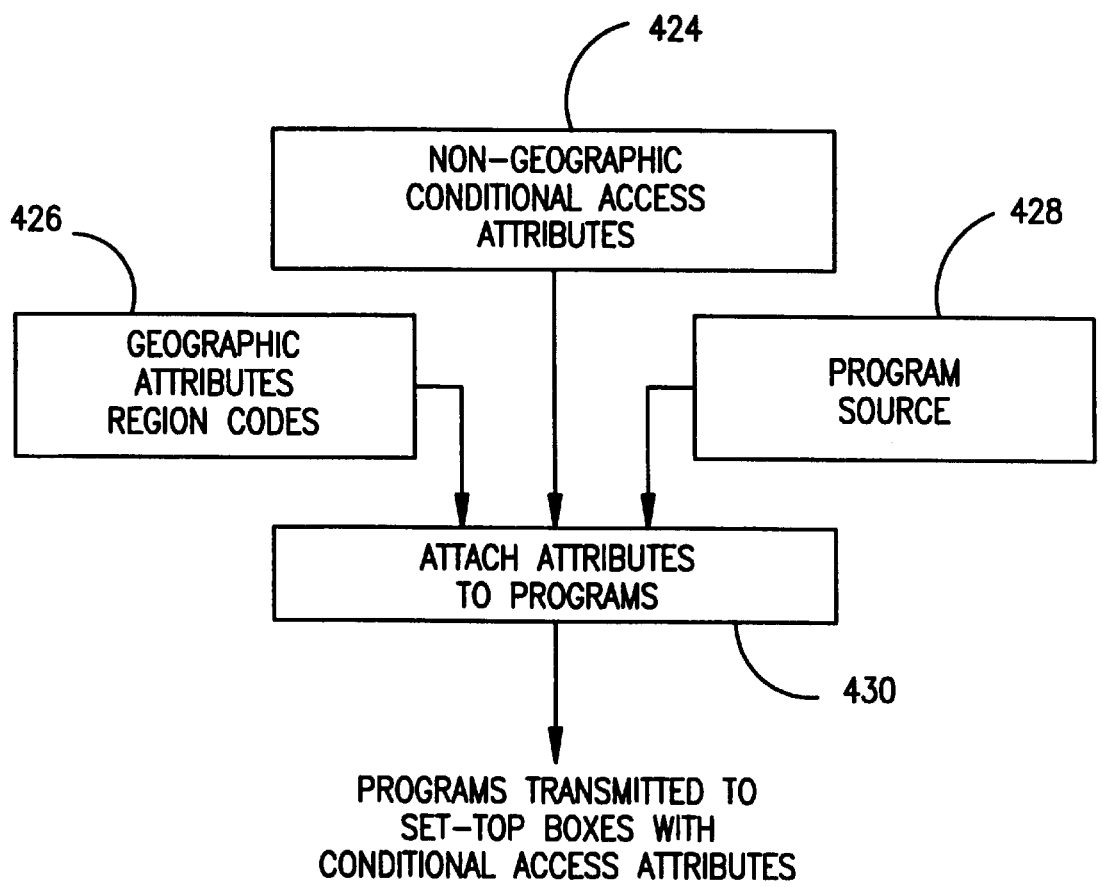
FIG. 8 is a simplified block diagram of a further supplemental portion of the central access control of FIG. 1.
Figure 9:
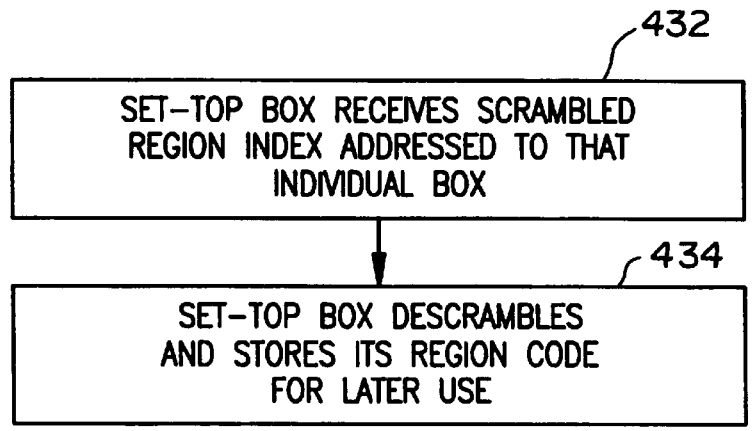
FIG. 9 is a simplified block diagram of a supplemental portion of the customer access control of FIG. 2.
Figure 10:
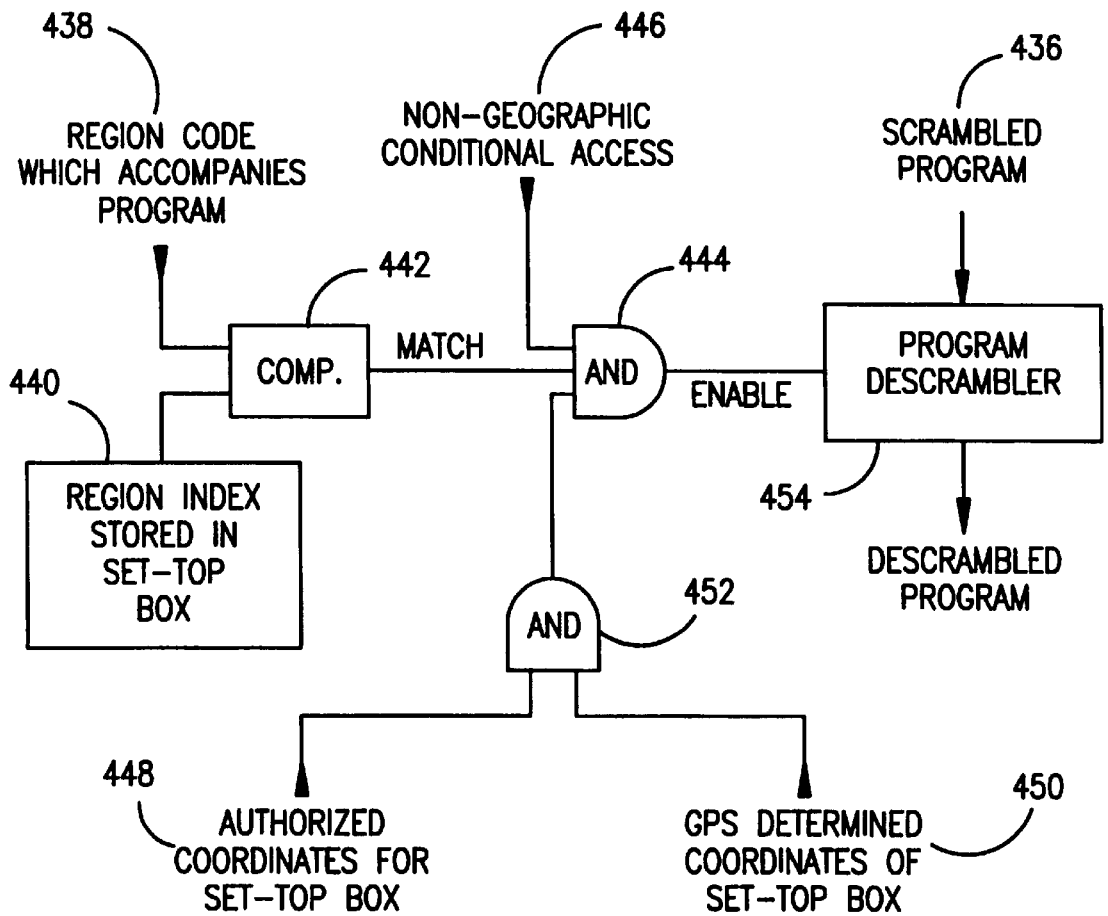
FIG. 10 is a simplified block diagram of a further supplemental portion of the customer access control of FIG. 2, which portion is a first embodiment geographically flexible customer access control.

A first method to provide flexible geographic conditional access has a first part of the method performed at the location of the Service Provider as shown in FIGS. 7 and 8 and a second part the remaining second part at the Set-Top box as shown in FIGS. 9 and 10.

Referring initially to FIG. 7, the Service Provider is required to have in his possession the address for each new subscriber 410, which he enters into his database of subscribers and addresses 412. The Subscriber Database 412 is converted to a database where geographic coordinates are created for each subscriber 414. This geographic position information of each Set-Top box must have sufficient accuracy to determine in which of several regions (discussed in more detail below) each individual Set-Top box belongs. Geographic regions, which may be specific television broadcast markets such as a city and its surrounding area, are defined by coordinate sets in 416. Each region is assigned a unique Region Index and the coordinate sets for a given region define the boundaries for that region. The coordinate sets may be orthogonal linear coordinates, angles and corresponding radius lengths from a given center point, or any other type of set that can be used for defining a boundary, either with or without interpolation. A given region may be identified as coinciding with the coverage area of a local broadcast terrestrial transmitter. Next, in block 418, each subscriber's coordinates are used to determine in which region the subscriber is located. The coordinate sets defined in 416 are interpolated so as to determine a boundary for a particular region. (Although not separately shown, it will be understood that a do loop process of iterating the region index may be performed so that a customer's location is tested against each of several coordinate sets.) The subscriber's coordinates are then checked to determine if said coordinates are inside of the region. When the correct Region is determined for a subscriber the Region Index is tagged to that subscriber. The tagged subscribers are entered into the List 422. Each subscriber is individually addressable by the Conditional Access System and the operation shown in 422 serves to transmit the appropriate Region Index to each subscriber in a secure scrambled fashion. The Region Index may be transmitted as part of the user authorization data messages of FIG. 1.

A region may correspond to one particular country but not another country. Alternately, a region may be legally pre-defined around a certain metropolitan area. Still another example is a Region to be excluded, or blacked-out.

FIG. 8 shows the addition of Conditional Access information to each program to be scrambled and broadcast by the satellite. Non-geographic conditions are formed in 424 to be included in the composite Conditional Access. These include premium channels and the other program groups in which this particular program is assigned from a subscription standpoint. The geographic attributes are added in 426 and serve to indicate which regions are eligible to receive this program. Region codes are used as attributes which may later be matched with a Region Index at the Set-Top box.

Finally, the program source 428 itself is included such that all attributes and the program are assembled for transmission in 430. The combination of the program and the attributes are uplinked to a satellite and then downlinked in the manner discussed for FIG. 1 with the modification that the data messages include the Region Code for a given program.

The second part of this method occurs at the customer access control such as the FIG. 2 Set-Top box 37 as modified according to the following discussion. Conditional access which results in descrambling the program for use occurs (i.e., access is granted) when all of the following conditions are met:

1. The Region Code which accompanies scrambled programming must match the Region Index previously transmitted by the Service Provider and securely stored in the box.

2. The GPS must indicate, per the discussion relative to the parent application and as discussed for FIGS. 1–6 above, the Set-Top box has not been moved from its authorized location.

3. Other conditional access criteria which includes the customer subscription to the particular programming and satisfactory account status.

There may be programming which is not to be restricted to a region such as a particular metropolitan area but which may be received and used outside of the region or metropolitan area. In this case the programming shall be transmitted to the Set-Top box with the special Region Code carrying the meaning of all regions. That is, any region can access it. For this case item one above is automatically satisfied and the system operates like the system of the parent patent application and FIGS. 1–6 above, which embodies only conditions 2) and 3) above.

FIG. 9 shows the individual Set-Top box operation of receiving the Region Index intended for the box. The scrambled Region Index is received in 432 and passed to 434 where it is subsequently de-scrambled and securely stored for later use in comparison with the Region codes attached to each program.

FIG. 10 shows the process of enabling the descrambling of a scrambled program 436. As previously described with reference to FIG. 8 the scrambled program has attached to it one or more Region Codes. In FIG. 10 these Region Codes are stripped from the scrambled program 436 to become the separated codes 438. A Region Code 438 is compared with the Region Index 440 stored as in FIG. 9, this comparison being performed by a region comparer 442. The region comparer 442 could, for example, be a plurality of AND gates which compare the Region Code(s) and the Region Index bit-by-bit. As with the gates and other hardware components illustrated in this and the other FIGS. herein, the region comparer 442 could be implemented as a software step rather than as a hardware component.

Where more than one Region Code is attached to the scrambled program 436 in FIG. 10 the Region Codes are compared in sequence by region comparer 442 to determine if there is any match between any of the Region Codes 438 and the Region Index 440. If any match occurs, the output of the region comparer 442 serves as an enabling input to AND gate 444. The Non-geographic conditional access signal 446 (i.e., representative of the customer's account being reasonably current, the customer having elected to get a given premium channel or program, etc.) is provided using known systems and provided as a second enabling input to AND gate 444. The third input to AND gate 444 is provided by the AND gate 452 which compares the authorized coordinates 448 for the Set-Top box 37 of FIG. 2 with the GPS determined coordinates 450. When all three enabling inputs to AND gate 135 are present the program de-scrambler 454 is enabled and the Scrambled Program 436 is de-scrambled.

It will be appreciated that a latch or other storage device, not shown, might be used for the enable out of gate 444 in the case where multiple Region Code(s) are included in the program. Alternately, a given Region Code 438 may be interpreted by Region Comparer 442 as a match for several of the Region Indices 440 in which case latching of enable is not required. Likewise, in the simple case where only a single Region Code accompanies a given program, latching of an enable is not required. However, latching of an enable might also be used if the regions overlap such that a box might be in two regions at a given time and, thus, have two Region Indices that would be sequentially compared in region comparer 442 against any Region Code(s) 438.

It will be appreciated that combinations of regions may be readily structured and used for cases where different legal restrictions are in force for different program segments. As an example, one program assigned to Region A whose scrambled signal can be received by a subscriber in Region B will not be accessible to said subscriber because of a mis-match between the subscriber Region and that Region for which the program is intended. A different program, as a second example can be assigned to both Regions A and B and be potentially accessible to subscribers in both those Regions. In fact, a program can be enabled for all Regions. This becomes the situation described in the parent patent application.

A second method to achieve geographic conditional access involves a first part which is performed by the Service Provider and a second part performed by the Set-Top box. This method has similarity to the first disclosed method but also contains important additions. In this second method the Set-Top box is provided with a region coordinate set that, when interpolated, describe the geographic boundary around eligible receiving sites. The coordinate sets are available to the Set-Top box by two different means. In the first means the coordinates are communicated in a scrambled fashion to the Set-Top box via the satellite transmission. In the second means the coordinates are pre-programmed into the secure authorization card assigned to said Set-Top box, often called the Smart Card. Alternatively where such a card is not used in the Set-Top box the coordinates can be saved in a secure section of memory inside the box. With either of these coordinate access methods the Set-Top box first calculates needed interpolations and then uses the GPS to determine whether the Set-Top box is inside the boundary described by one or more region coordinate set. One particular set of coordinates is sent to all of the boxes which were pre-determined to be within the aforementioned geographic boundary by the means described for the first method of this invention. If the box position is inside the boundary then geographic conditional access is granted. If other criteria which includes payment for the service is also satisfied then the program desired by the customer will be de-scrambled by the Set-Top box.

The geographic coordinates to be sent to each Set-Top box are those which describe a certain region. As discussed in the first method a shorthand Region Index is used to denote each particular region. In this second method one or more Region Index (Indices) is delivered to each Set-Top box consistent with the geographic address of the box. Subsequent to this operation each group of coordinates which bounds a certain Region has attached to it the appropriate Region Index. The Set-Top box then saves the set of coordinates whose Region Index matches the Region Index previously and individually provided to said box.

The Set-Top Box with the above described capability can now perform two operations using GPS. It can perform the function of determining if said box has been moved from its initial location, as before, and secondly it can now determine whether or not it is anywhere within a certain region described by the Region coordinate set, even though it may have been moved from its initial operating location. Said two operations are useful in the two different programming conditions:

1. It is desired that for some programming the Set-Top box not be removed to some commercial location from its registered residential location, and
2. It is satisfactory for some programming that the Set-Top box be usable anywhere within the allowed Region regardless of commercial or residential.

Thus programs can be additionally tagged as to which of the two situations independently is to be implemented for the program material. The Set-Top box can also be operated in a mode wherein neither geographic requirement is mandatory when a program is appropriately tagged. Finally, the Set-Top box can be operated such as to require both of said conditions simultaneously.

The details of the second method will be described relative to the first method. All of the operations shown in FIG. 7 and FIG. 8 are performed for method two as well as method one. In addition method two provides for using the region coordinates directly in the Set-Top box. In the case where these coordinates are transmitted in scrambled form to each Set-Top box, they are done so with the appropriate Region Code tagged onto each coordinate group. In this way each coordinate group may be transmitted just once rather than individually for each Set-Top box. Each Set-Top box is programmed to accept and store the coordinate set for the region whose Region Code matches the Region Index which has been individually sent to each Set-Top box. As previously mentioned, the matter of transmission of coordinate sets to the boxes can be replaced by the action of providing these coordinate sets already inside the Set-Top box at the time of purchase or lease by the subscriber. The coordinate set might be securely stored in the Smart Card, as an example although other implementations accomplish the same basic purpose.

The Set-Top box for method two operates according to FIG. 9, except that the coordinate set must additionally be received and stored by the Set-top box.

Figure 11:
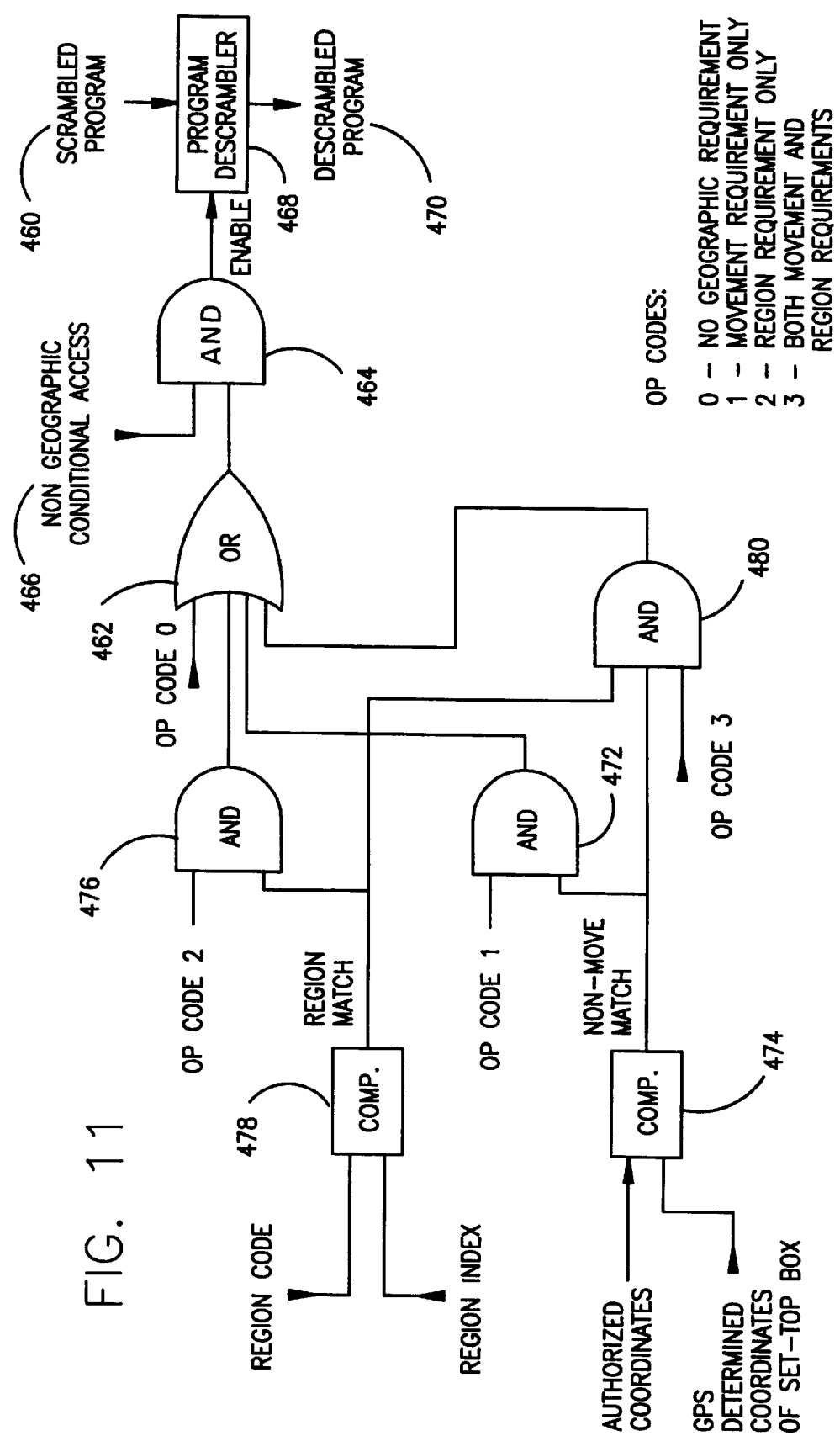
FIG. 11 is a simplified block diagram of a second embodiment geographically flexible customer access control.

FIG. 11 shows the logic operation for the Set-Top box operating according to the second method. An Operational Code, hereafter call Op Code, is transmitted from the satellite in addition to the Region Code for each Scrambled Program 460. This Op Code has four possible values 0, 1, 2 and 3 whose meanings are shown in FIG. 11. The Set-Top box recognizes the Op Code and provides decoding of it to generate four possible enabling lines. In FIG. 11 these enabling lines are called, respectively, Op Code 0, Op Code 1, Op Code 2 and Op Code 3. Only one of the four will be active, meaning it enables operation of the gate receiving its signal, for a particular program. OR gate 462 responds to the four possible geographic Op Codes such that if any of the inputs is satisfied its output is an enabling input to AND gate 464. The second input to AND gate 464 is the Non-Geographical Conditional Access input 466. If both inputs to AND gate 464 are active then Program De-scrambler 468 de-scrambles program 460 to provide output program 470.

Further in FIG. 11, OR gate 462 responds directly to Op Code 0 and provides an enabling output for the case where there are no geographic requirements for the current program. Op Code 1 control AND gate 472 provides an active output when the Non-movement condition (per the parent application and arrangement of FIGS. 1–6 above) is satisfied by GPS comparer 474. Op Code 2 enables AND gate 476 such that a match between Region Code and Index Code in region comparer 478 will enable the output of OR gate 462. Finally, the output of AND gate 480 is enabled for Op Code 3 when both geographic conditions (box at proper coordinates and in proper region) are met.

FIG. 11 is shown in a form to facilitate understanding and other forms of implementation could be used. First, the logic can be written down and simplified to create fewer gates. Second, the comparison of Authorized Coordinates and GPS determined coordinates is a comparison of vectors rather than two binary inputs, but is shown as a binary function for ease of illustration. Further, and as mentioned above, software implementation of various components of the invention might alternately be used.

Figure 12:
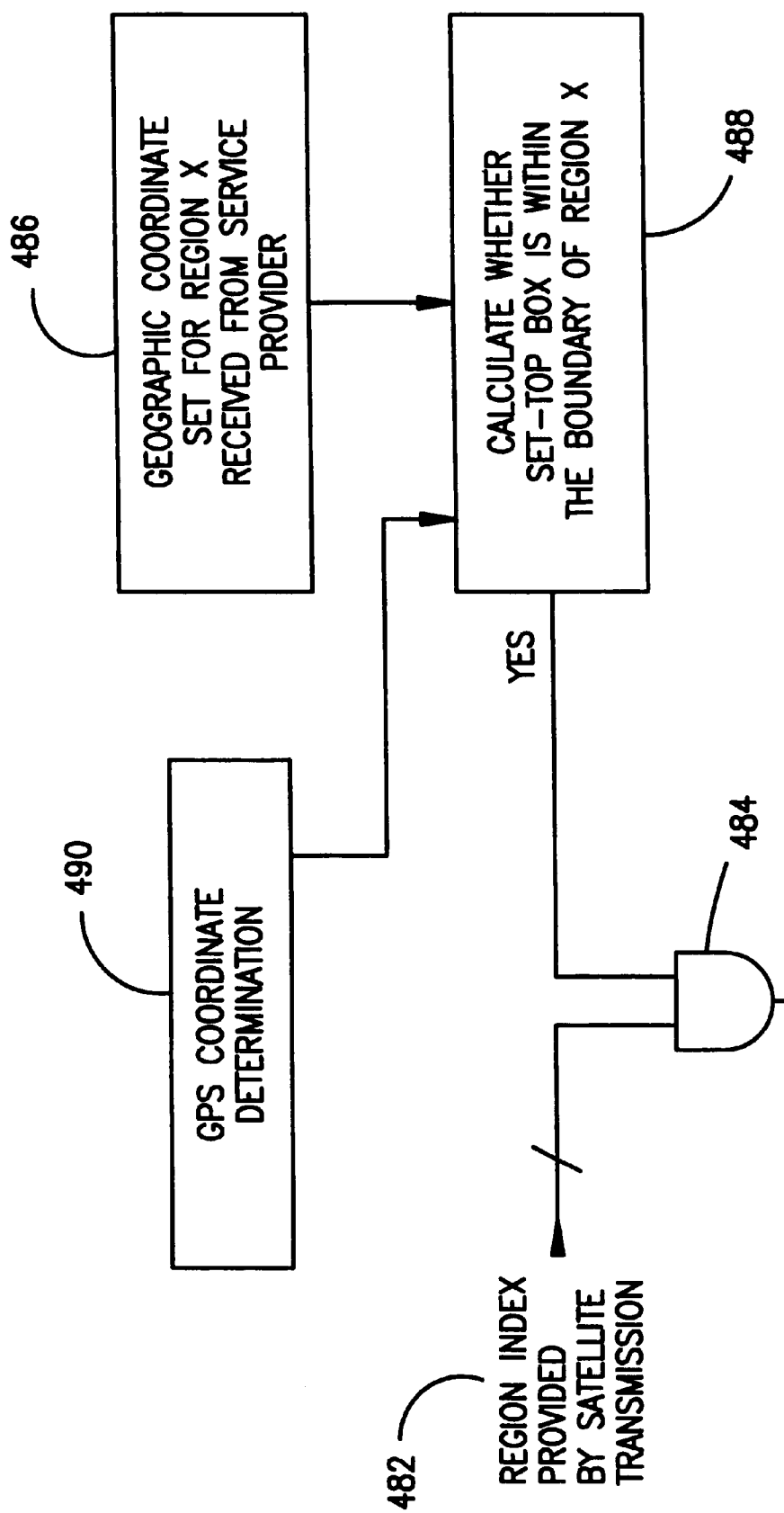
FIG. 12 is a region determiner arrangement which may be used with any of several embodiments of geographically flexible customer access control.

The Region Index as input to region comparer 478 is a modified version of the Region Index as determined in method one where it was provided directly from the satellite to each Set-Top box separately. The modification is shown in FIG. 12. The Region Index provided by the Service Provider for each particular Set-Top box is 482 in FIG. 12. Gate 484 serves to pass the Region Index 482 under the condition that the box is actually located in the Region X whose coordinates set is in 486 and whose Index number is 482. Calculation device or software 488 compares the sensed GPS 490 with the coordinate set(s) 486 and outputs a "yes" or enable when the GPS shows the box is in the proper region. is the process which performs the necessary calculations to determine whether the GPS determination performed in 320 is inside Region X.

A third method provides the capability for the Set-Top box itself to learn in what Region it presently resides. This permits the flexibility for the subscriber of transporting the Set-Top box to a different Region, perhaps a vacation area, and be able to use said box with programming authorized for that Region instead of the Region where the box had been authorized. In this case the Set-Top box must not be located in an invalid Region in order to de-scramble programming for use. one example of an unauthorized region might be a foreign country. Another example is a Region which is indeed defined by a coordinate set but which is unauthorized for the subset of local programming which is generated for use only in a different Region.

In the third method coordinate sets for multiple Regions are stored in the Set-Top box. These coordinate sets can be acquired by said box by one of two means. The first means is by securely receiving the coordinate sets via the satellite transmission of them. The sets are stored inside said box in a tamper proof manner. The second means of storage is the aforementioned Smart Card which is provided at the time of purchase or lease of said box. A variant of this is the secure storage of the coordinate sets in the box itself at the time of purchase or lease.

The coordinate sets stored in the Set-Top box are organized in a hierarchy such as to include both geographic Regions which are legally protected and larger geographic areas such as individual countries. That is, a Set-Top box may be located inside a country where the rights for programming exist, but the site of said box may be outside of any Region which is protected from receiving programming not locally licensed. Such areas would occur where programming from a terrestrial broadcast transmitter cannot be received because the distance away from said transmitter is too great to permit reception. There would not be any geographic restriction in this case where the Set-Top box is inside a permitted country but outside any Region with legal restrictions. Another way of representing it is that programming which is authorized for one local area can be legally de-scrambled in that Region corresponding to the same said Region or all areas which are not defined as Regions but which are within the boundaries of the allowed country.

In summary, a large area or Region is first defined, such as a country, within which de-scrambling of programming can be permitted, subject to geographic restrictions in localized areas but outside of which de-scrambling is not permitted. Second, if the large Region criteria is satisfied and the geographic location of the Set-Top box is not within any local Region in the larger Region then no geographic restriction shall apply to any programming which has restrictions for some regions. However, if said box is within one of the defined localized Regions then restrictions of programming can be imposed by the Service Provider for some subset of programming.

Figure 13:
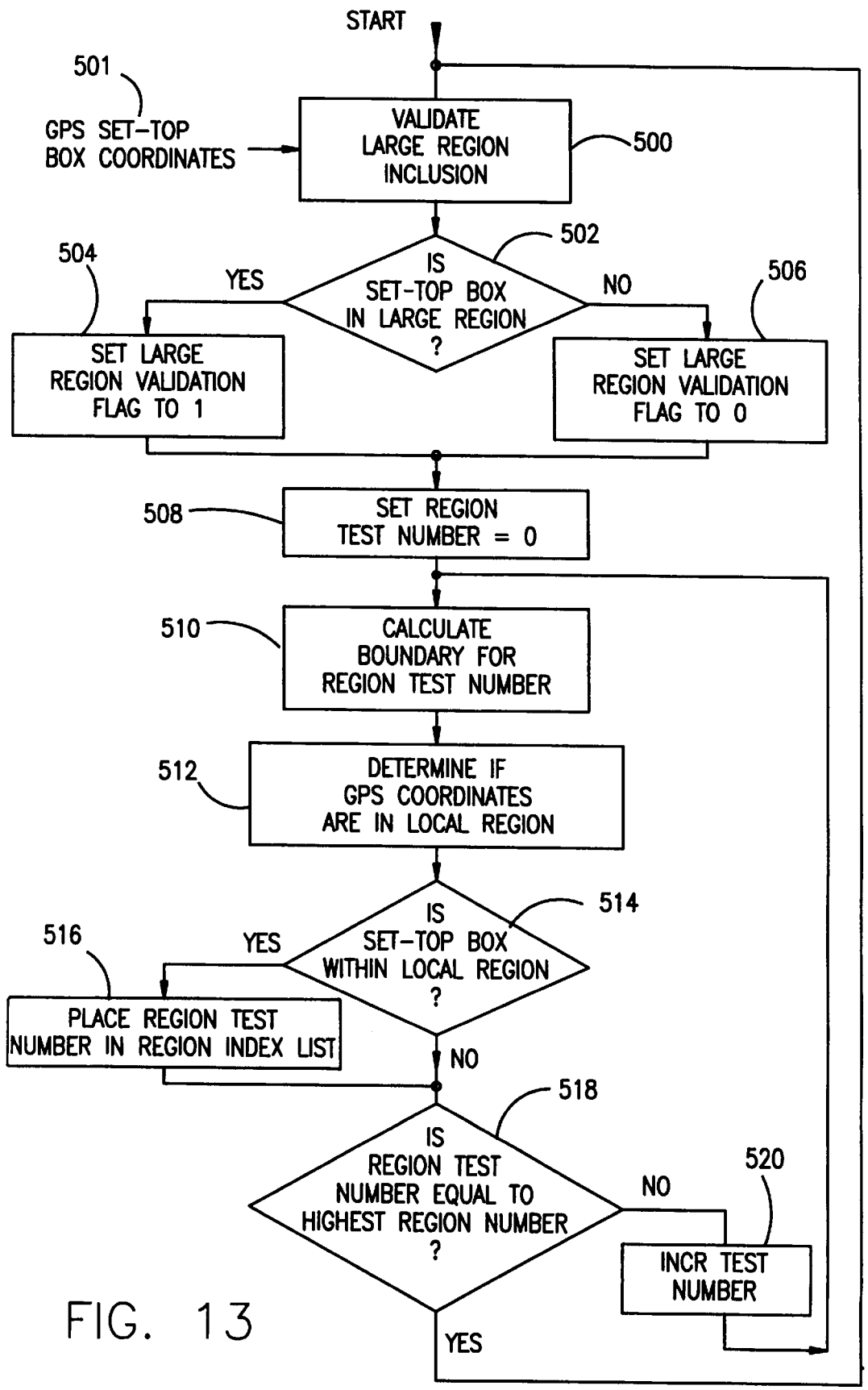
FIG. 13 is a flow chart for a third embodiment geographically flexible customer access control.

In FIG. 13, there is a flow chart showing first the large region validation and next the determination of local region (s). The GPS coordinate data is furnished to the process in 500 where the actual GPS data 501 sensed for the customer access control box is compared at box 502 to the coordinate set for the large area. The region validation flag is set to 1 in box 504 if the set-top or customer access box is in the large area, whereas box 506 sets the validation flag to 0 if it is not in the large area.

The processing of the Large Region is complete at this point in FIG. 13. Had there been multiple Large Regions rather than a single Large Region, a modified processing method would have been required, similar to the method which will next be described for the determination of one or more Region Indices.

At box 508, the region test number is initialized and control goes to 510 which calculates the boundary for a region. Next, box 512 determines by way of box 514 if the GPS coordinates from 501 are in a particular local region. Box 516 puts the region number in a Region Index list if the test is positive. Box 518 tests if the highest region number is the one under test. If not, control goes back to box 510 by way of box 520, which increments the region number. When all regions have been tested, the yes from box 518 goes back to box 500.

Although not shown, if no regions are found, a No-Region flag is set to one (active).

As shown in FIG. 13, the third method provides the capability for the Set-Top box itself to learn in what Region it presently resides. This permits the flexibility for the subscriber of transporting the Set-Top box to a different Region, perhaps a vacation area, and be able to use said box with programming authorized for that Region instead of the Region where the box had been authorized. In this case the Set-Top box must not be located in an invalid Region in order to de-scramble programming for use. One example of an unauthorized region might be a foreign country. Another example is a Region which is indeed defined by a coordinate set but which is unauthorized for the subset of local programming which is generated for use only in a different Region.

In the third method coordinate sets for multiple Regions are stored in the Set-Top box. These coordinate sets can be acquired by said box by one of two means. The first means is by securely receiving the coordinate sets via the satellite transmission of them. Said sets are stored inside said box in a tamper proof manner. The second means of storage is the aforementioned Smart Card which is provided at the time of purchase or lease of said box. A variant of this is the secure storage of the coordinate sets in the box itself at the time of purchase or lease.

The coordinate sets stored in the Set-Top box are organized in a hierarchy such as to include both geographic Regions which are legally protected and larger geographic areas such as individual countries. That is, a Set-Top box may be located inside a country where the rights for programming exist, but the site of said box may be outside of any Region which is protected from receiving programming not locally licensed. Such areas would occur where programming from a terrestrial broadcast transmitter cannot be received because the distance away from said transmitter is too great to permit reception. There would not be any geographic restriction in this case where the Set-Top box is inside a permitted country but outside any Region with legal restrictions. Another way of representing it is that programming which is authorized for one local area can be legally de-scrambled in that Region corresponding to the same said Region or all areas which are not defined as Regions but which are within the boundaries of the allowed country.

In summary, a large Region is first defined, such as a country, within which descrambling of programming can be permitted, subject to geographic restrictions in localized areas but outside of which descrambling is not permitted. Second, if the large Region criteria is satisfied and the geographic location of the Set-Top box is not within any local Region in the large Region then no geographic restriction shall apply to any programming which has restrictions for some regions. However, if said box is within one of the defined localized Regions then restrictions of programming can be imposed by the Service Provider for some subset of programming.

In method 3 the Set-Top box has stored in its memory the geographic coordinate sets for the Large Region(s) which determine the boundary for one or more countries and the sets for the multiple local Regions. A unique Region Index number is included with each coordinate set. Starting with these coordinate sets and the GPS coordinate data determined in the Set-Top Box, the functions in FIGS. 13 and 16 are implemented.

It will be appreciated that this processing is exemplary for this system and may take modified forms. One example is that the continual processing of all the localized Regions might be replaced with confirmation testing of that same Region once the Region index has been established. Testing all Regions might be initiated again only if the established Region fails to pass the confirmation test.

Figure 16:
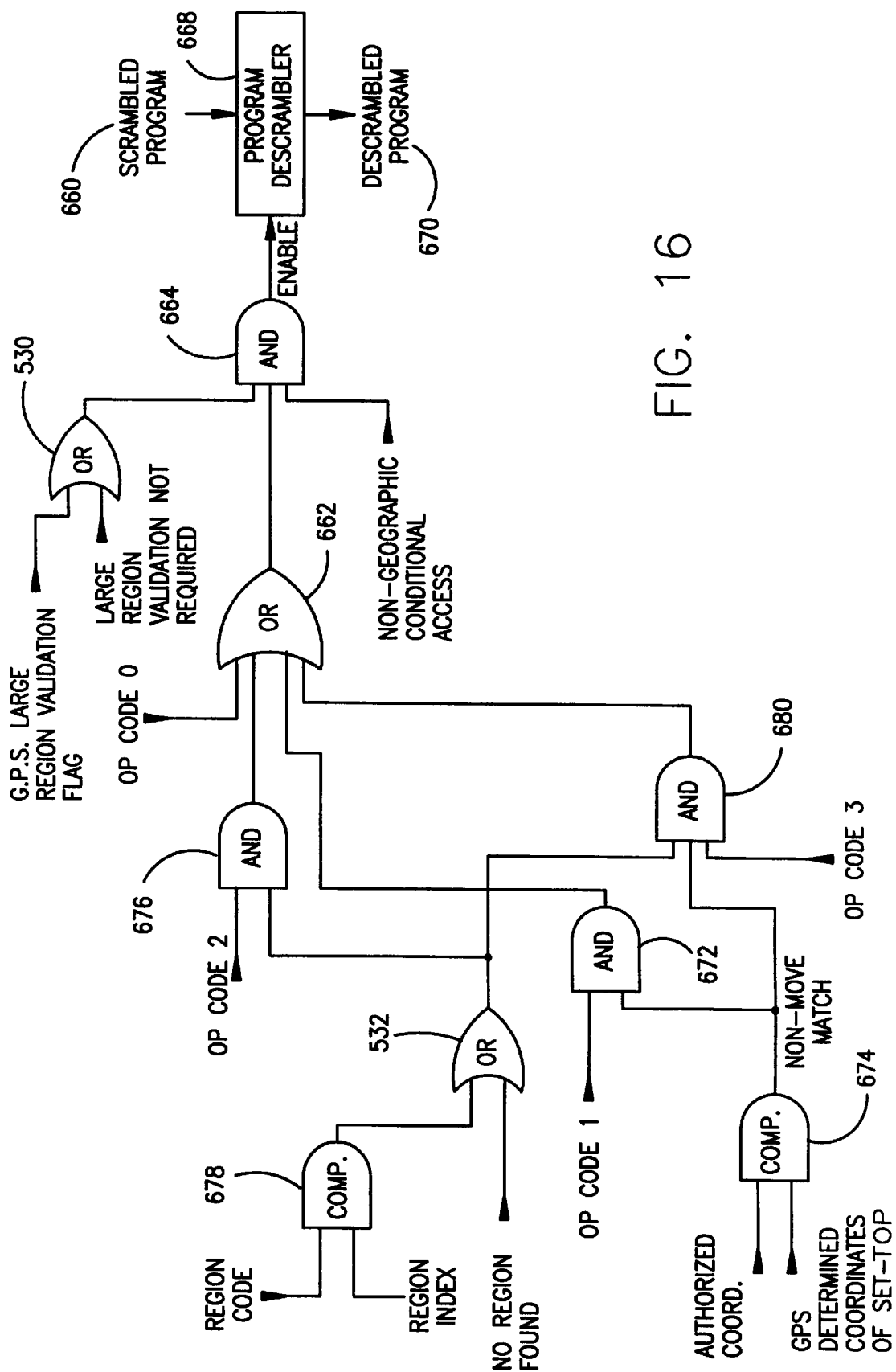
FIG. 16 is a simplified block diagram of the third embodiment geographically flexible customer access control.

In FIG. 16, the determination made in FIG. 13 processing along with the initially authorized coordinates for Set-Top box and non-geographic conditional access information are used to enable descrambling if appropriate. The same Op Codes are employed as in FIG. 11 with the individual programs. It is assumed here that the incoming coded Op Code is decoded such that only one of the Op Codes zero through 3 is active at a time. In addition, there is supplied a Large-Region-Validation-Not-Required indicator which comes with the program material. If this indicator is one, then the input by that name to OR gate 530 is high, or active.

The operation in FIG. 16 proceeds similarly to that of FIG. 11. Components that are operable in essentially the same fashion as components in FIG. 11 will be numbered in the 600 series with the same last two digits and the discussion herein will focus on differences. However, the first difference is that AND gate 664 now has three inputs instead of two. The new input comes from OR gate 530 which is active (a one) if either the GPS Large-Region-Validation-Flag is active (a one) or the Large-Region-Validation-Not-Required Flag is active (a one). These were determined in the processing of FIG. 13. The output of AND gate 664 is active and the Program Descrambler 668 enabled if all three inputs to 664 are active (all ones).

The other difference in FIG. 16 from FIG. 11 is the addition of OR gate 532. The purpose of this gate is to provide an active input (a one) to gates 676 and 680 if either of two conditions is satisfied. The first is a match found between the Region Index stored in the Region Index list and the Region Code which appears with the particular program. The second is the flag which is active if no local Region was found in the search in FIG. 13.

Figure 14:
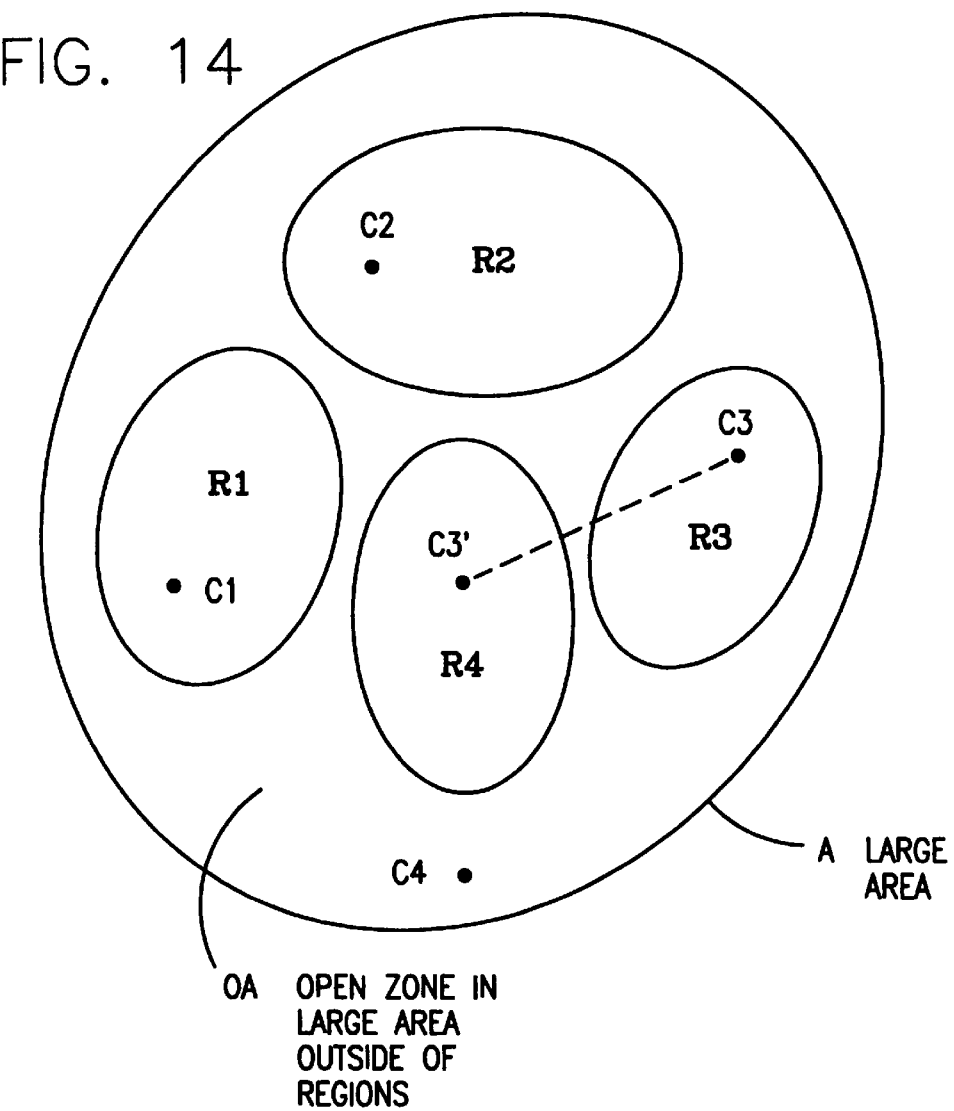
FIG. 14 is an illustration of geographic regions within a large area and used for explaining operations of the present invention.

With reference to FIG. 14 practical aspects of the operation of the present will be illustrated by examples. The large area A includes regions R1, R2, R3, and R4 and an open area OA within A, but outside of regions R1 through R4. A customer C1 in region R1 can receive signals that are region-specific for region R1. Additionally, the customer or subscriber C1 can receive signals that are large area signals (i.e., can be accessed anywhere in area A) and are not region specific. The customer may receive other signals called region-exclusion signals, that are blacked out of one or more regions R2, R3, and R4, but are accessible in region R1. For example, if a particular network has no affiliates in region R1, an affiliate signal from one of regions R2, R3, or R4 might be made accessible in region R1 even though it is excluded from other regions having an affiliate of that network. Other signals, called location-specific signals, may be accessible only if the customer access control or set-top box 37 of FIG. 2 remains at a single fixed location as explained in the preferred arrangement given for FIGS. 1–6. Of course, any or all of those classes of signals may include non-geographic restrictions on them such as the subscriber's account being paid in a reasonable time and the customer having elected to receive any premium channels.

Customer C2 lives in a region R2, which may be associated with a different city or television broadcast market from that of region R1. Customer C2 would receive signals in similar fashion to customer C1 except that C2 receives region-specific signals for region C2 and receives region-exclusion signals provided that they are not excluded from region C2. An example of a region-exclusion signal would be when a sports premium channel or a pay per view channel broadcasts a sports event that is contractually blacked out from region R2. The blackout region may be a region code, not shown, that could, by way of appropriate gates, disable gate 664 of FIG. 16 such that access to such program would be denied.

Customer C3 lives in a region R3 and receives signals similar to the other customers based on C3's location in region R3. Again, this customer or subscriber receives region-specific signals corresponding to region R3.

The invention allows two possibilities if the customer C3 moves with his set-top box or customer access control to location C3' in region R4. A first technique prevents usage in other regions. For example, a region determiner similar to FIG. 12 may compare the previously stored region index with the current value and block access upon a change. (The previously stored index may be a region index in the customer access control box set by a smart card or other tamper resistant programming when provided to the customer or simply the initial determined value using a region determiner like FIG. 12.) However, a second technique allows the customer to move the box or customer access control 37 from region R3 to region R4.

In order to accommodate movement from one region to another, the FIG. 12 region determination technique may simply sense that customer C3 has moved from region R3 to region R4 and grant access to region-specific signals for region R4 (but no longer give access to region-specific signals for region R3). Any location-specific signals would no longer be accessible. However, a tamper resistant technique allowing the Service Provider to reset coordinates for the new location of the customer by addressing the customer's set top box could also be provided such that the customer could receive location-specific signals at the new location.

Customer C4 is in large area A, but is in an open zone outside of the broadcast market or other regions R1 through R4. Since customer C4 is not in any of the regions R1 through R4, that customer could be allowed access to any network affiliate channels from any or all of the regions R1 through R4 depending on contractual and/or copyright considerations.

Figure 15:
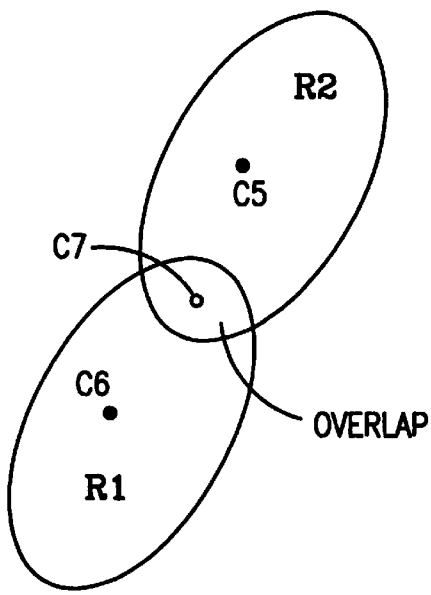
FIG. 15 is another illustration of geographic regions used for explaining operations of the present invention.

With reference to FIG. 15, customer C5 gets programming authorized for region R2, whereas customer C6 gets programming authorized for region R1. However, since regions R1 and R2 overlap and customer C7 lives in the overlap or union of the regions, customer C7 may receive signals for both regions R2 and R1.

Although specific constructions have been presented herein, it is to be understood that these are for illustrative purposes only. Various modifications and adaptations will be apparent to those of skill in the art. In view of possible modifications, it will be appreciated that the scope of the present invention should be determined by reference to the claims appended hereto.

What is claimed is:

1. A video signal access control system comprising a customer access control operable at a customer location and having:

a signal input to receive at least one video signal from a remote source;

a video signal processor operably connected to receive video signals from the signal input;

a conditional accesser operably connected to the video signal processor;

a signal output operably connected to the video signal processor and providing a useable video output signal only upon the conditional accesser authorizing access to one or more video signals from the remote source;

a GPS signal receiver operable at the customer location to receive position information from remote sources and operably connected to the conditional accesser, the conditional accesser authorizing access only if the GPS signal receiver receives signals consistent with the customer access control being at an authorized location; and a region comparer to compare a region code received with the at least one video signal from the remote source with a region index stored at the customer location and operable to output a region comparer output, the region code being representative of a geographic region authorized to receive a signal and the region index being representative of a geographic region in which the customer access control is located, there being different region codes for different geographic regions, at least some of the region codes excluding access outside of their corresponding geographic region that is authorized to receive a signal; and wherein the conditional accesser receives the region comparer output and conditions access to a given one(s) of the video signals from the remote source upon the region comparer output indicating that those given one(s) of the video signals are authorized for an access region in which the customer access control is located, and wherein the region comparer and conditional accesser are together operable to prevent customers at the customer location from accessing video signals having region codes that exclude access in the access region in which the customer access control is located.

2. The video signal access control system of claim 1 wherein the conditional accesser authorizes access to at least some signals only if the GPS signal receiver receives signals consistent with the customer access control being at a single fixed location authorized for service.

3. The video signal access control system of claim 2 wherein the conditional accesser authorizes access to signals known as location-specific signals only if the GPS signal receiver receives signals consistent with the customer access control being at a single fixed location authorized for service; and wherein the conditional accesser authorizes access to signals known as regional signals, even if the GPS signal receiver receives signals inconsistent with the customer access control being at a single fixed location authorized for service, provided that the region comparer output indicates that the video signals are authorized for the access region of the customer access control.

4. The video signal access control system of claim 3 wherein the access region of the customer access control is an access region in which the customer access control is actually located as sensed by use of the GPS signal receiver and the region index represents the region in which the customer access control is actually located.

5. The video signal access control system of claim 3 wherein the access region of the customer access control is an access region in which the customer access control is authorized for placement and the region index represents the region in which the customer access control is authorized for placement.

6. The video signal access control system of claim 1 wherein the conditional accesser authorizes access to signals known as location-specific signals only if the GPS signal receiver receives signals consistent with the customer access control being at a single fixed location authorized for service; and wherein the conditional accesser authorizes access to signals known as regional signals, even if the GPS signal receiver receives signals inconsistent with the customer access control being at a single fixed location authorized for service, provided that the region comparer output indicates that the video signals are authorized for the access region of the customer access control.

7. The video signal access control system of claim 6 wherein the access region of the customer access control is an access region in which the customer access control is actually located as sensed by use of the GPS signal receiver and the region index represents the region in which the customer access control is actually located.

8. The video signal access control system of claim 6 wherein the access region of the customer access control is an access region in which the customer access control is authorized for placement and the region index represents the region in which the customer access control is authorized for placement.

9. The video signal access control system of claim 1 the region index represents the region in which the customer access control is authorized for placement and the region index is set in the customer access control prior to providing it to the customer.

10. The video signal access control system of claim 1 further comprising a central access control remote from customers and operable to transmit the region index for each customer such that the region index for that customer is stored in the customer access control; and wherein the region index represents the region in which the customer access control is authorized for placement.

11. The video signal access control system of claim 1 wherein the large area includes the plurality of regions; and wherein the conditional accesser authorizes access to signals known as region-exclusion signals provided that the customer access control is within the large area and outside of one or more of regions where the particular signal is excluded.

12. The video signal access control system of claim 1 wherein a large area includes at least the plurality of regions; and wherein the conditional accesser authorizes access to signals known as large area signals provided that the customer access control is within the large area.

13. The video signal access control system of claim 1 wherein the customer access control is a non-transmitting unit.

14. The video signal access control system of claim 1 wherein the customer access control is operable in different ones of a plurality of access regions, the customer access control granting access to signals corresponding to each access region when the customer access control is in that region.

15. A video signal access control system comprising a customer access control operable at a customer location and having:

a signal input to recieve at least one video signal from a remote source;

a video signal processor operably connected to receive video signals from the signal input;

a conditional accesser operably connected to the video signal processor;

a signal output operably connected to the video signal processor and providing a useable video output signal only upon the conditional accesser authorzing access to one or more video signals from the remote source;

a GPS signal receiver operable at the customer location to receive position information from remote sources and operably connected to the conditional accesser, the conditional accesser authorizing access only if the GPS signal receiver receives signals consistent with the customer access control being at an authorized location; and a region comparer to compare a region code received with the at least one video signal from the remote source with a region index stored at the customer location and operable to output a region comparer output, the region code being representative of a geographic region authorized to receive a signal and the region index being representative of a geographic region of the customer access control, there being different region codes for different geographic regions, at least some of the region codes excluding access outside of their corresponding geographic region that is authorized to receive a signal; and wherein the conditional accesser receives the region comparer output and conditions access to a given one(s) of the video signals from the remote source upon the region comparer output indicating that those given one(s) of the video signals are authorized for an access region of the customer access control; and wherein the access region of the customer access control is an access region in which the customer access control is actually located as sensed by use of the GPS signal receiver and the region index represents the region in which the customer access control is actually located.

16. The video signal access control system of claim 15 wherein the customer access control includes a region determiner that is supplied GPS data from the GPS signal receiver and is supplied boundary data corresponding to boundaries of one or more of several access regions, the region determiner outputting the region index based on the access region in which the customer access control is actually located as sensed by use of the GPS signal receiver and the region index represents the region in which the customer access control is actually located.

17. The video signal access control system of claim 16 wherein the customer access control is operable in different ones of a plurality of access regions, the customer access control granting access to signals corresponding to each access region when the customer access control is in that region.

18. A video signal access control system comprising a customer access control operable at a customer location at which one or more customers may be located and having:
 a signal input to receive at least one video signal from a remote source;
 a video signal processor operably connected to receive video signals from the signal input;
 a conditional accesser operably connected to the video signal processor;
 a signal output operably connected to the video signal processor and providing a useable video output signal only upon the conditional accesser authorizing access to one or more video signals from the remote source;
 a GPS signal receiver operable at the customer location to receive position information from remote sources and operably connected to the conditional accesser, the conditional accesser authorizing access only if the GPS signal receiver receives signals consistent with the customer access control being at an authorized location; and
 a region comparer to compare a region code received with the at least one video signal from the remote source with a region index stored at the customer location and operable to out put a region comparer output, the region code being representative of a geographic region authorized to receive a signal and the region index being representative of a geographic region of the customer access control, there being different region codes for different geographic regions, at least some of the region codes excluding access outside of their corresponding geographic region that is authorized to receive a signal; and wherein the conditional accesser receives the region comparer output and conditions access to a given one(s) of the video signals from the remote source upon the region comparer output indicating that those given one(s) of the video signals are authorized for an access region of the customer access control; wherein the conditional accesser authorizes access to signals known as regional signals provided that the region comparer output indicates that the video signals are authorized for the access region of the customer access control; and wherein the conditional accessor is operable to prevent customers at the customer location from accessing video signals having region codes that exclude access in the access region in which the customer access control is located.

19. The video signal access control system of claim 18 wherein a large area includes the plurality of regions; and wherein the conditional accesser authorizes access to signals known as large area signals provided that the customer access control is within a large area including a plurality of the regions.

20. The video signal access control system of claim 19 wherein the large area includes, in addition to the plurality of regions, an open zone; and wherein the conditional accesser authorizes access to signals known as region-exclusion signals provided that the customer access control is within the large area and outside of one or more of regions where the particular signal is excluded.

* * * * *